US010223342B2

(12) United States Patent
Neff et al.

(10) Patent No.: US 10,223,342 B2
(45) Date of Patent: Mar. 5, 2019

(54) NETWORK-ACCESSIBLE COLLABORATIVE ANNOTATION TOOL

(71) Applicant: Pearson English Corporation, Brisbane, CA (US)

(72) Inventors: Sam Neff, Novato, CA (US); Raymond Galang, San Jose, CA (US); Sundararajan Parasuraman, Chennai (IN)

(73) Assignee: Pearson Education, Inc., New York, NY (US)

( * ) Notice: Subject to any disclaimer, the term of this patent is extended or adjusted under 35 U.S.C. 154(b) by 801 days.

(21) Appl. No.: 14/109,856

(22) Filed: Dec. 17, 2013

(65) Prior Publication Data

US 2014/0108908 A1 Apr. 17, 2014

Related U.S. Application Data

(60) Division of application No. 12/767,786, filed on Apr. 26, 2010, now Pat. No. 8,612,469, which is a
(Continued)

(51) Int. Cl.
G06F 17/30 (2006.01)
G06F 17/24 (2006.01)
G06Q 10/10 (2012.01)

(52) U.S. Cl.
CPC .......... *G06F 17/241* (2013.01); *G06Q 10/10* (2013.01)

(58) Field of Classification Search
CPC ................................ G06F 17/30; G06F 17/00
See application file for complete search history.

(56) References Cited

U.S. PATENT DOCUMENTS 4,162,696 A * 7/1979 Sprung ...................... 206/316.2
4,251,694 A * 2/1981 Taylor ...................... 379/375.01
(Continued)

FOREIGN PATENT DOCUMENTS

| KR | 20060085126 A | 7/2006 |
| WO | 2004044741 A2 | 5/2004 |
| WO | 2005091175 A1 | 9/2005 |

OTHER PUBLICATIONS

Leland, Mary DP, Robert S. Fish, and Robert E. Kraut. "Collaborative document production using Quilt." In Proceedings of the 1988 ACM conference on Computer-supported cooperative work, pp. 206-215. ACM, 1988.*
(Continued)

*Primary Examiner* — Farhan M Syed
(74) *Attorney, Agent, or Firm* — Quarles & Brady LLP

(57) ABSTRACT

A network-accessible toolbox permits collaborative annotation, facilitating interaction and communication among users. In an implementation, content on a Web page, or other page or document accessible through a network or the Internet, can be annotated. A user can view the page and with the toolbox, select content on the page and make an annotation or suggestion. Multiple users can view and make annotations to the same page at the same time. After annotations are made, users can view the page with annotations made by other users. The author or owner of the page can accept or reject the annotations or suggestions made to the page. If the owner accepts a particular suggestion, the selected content is replaced with the suggestion.

18 Claims, 11 Drawing Sheets

Related U.S. Application Data continuation-in-part of application No. 12/390,450, filed on Feb. 21, 2009, now abandoned.

(60) Provisional application No. 61/178,933, filed on May 15, 2009, provisional application No. 61/172,605, filed on Apr. 24, 2009, provisional application No. 61/030,431, filed on Feb. 21, 2008.

(56) References Cited

U.S. PATENT DOCUMENTS

| | | | |
|---|---|---|---|
| 4,267,793 A * | 5/1981 | Lane et al. | 116/324 |
| 4,268,896 A * | 5/1981 | Mann | 362/311.01 |
| 4,280,159 A * | 7/1981 | Nakayama | 360/137 |
| 4,286,595 A * | 9/1981 | Ring | 604/16 |
| 4,291,696 A * | 9/1981 | Ring | 604/14 |
| 4,292,748 A * | 10/1981 | Miller | 38/102 |
| 4,321,920 A * | 3/1982 | Gillig | 604/28 |
| 4,337,761 A * | 7/1982 | Upsher | 600/188 |
| 4,338,795 A * | 7/1982 | House, Jr. | 62/372 |
| 4,349,216 A * | 9/1982 | Pilarski | 280/807 |
| 4,382,530 A * | 5/1983 | Calisto | 222/567 |
| 4,402,505 A * | 9/1983 | Young | 482/112 |
| 4,406,376 A * | 9/1983 | Berghahn | 215/224 |
| 4,432,104 A * | 2/1984 | Sasaki | 4/555 |
| 4,885,803 A * | 12/1989 | Hermann et al. | 398/112 |
| 5,067,070 A | 11/1991 | Miyao et al. | |
| 5,220,657 A * | 6/1993 | Bly et al. | 711/152 |
| 5,438,659 A * | 8/1995 | Notess et al. | 715/202 |
| 5,439,659 A | 8/1995 | Notess et al. | |
| 5,577,188 A * | 11/1996 | Zhu | 715/745 |
| 5,583,978 A * | 12/1996 | Collins | G06F 17/214 345/170 |
| 5,644,754 A * | 7/1997 | Weber et al. | 703/24 |
| 5,671,428 A * | 9/1997 | Muranaga et al. | 715/751 |
| 5,721,912 A | 2/1998 | Stepczyk et al. | |
| 5,781,714 A * | 7/1998 | Collins | G06F 17/214 345/471 |
| 5,822,539 A | 10/1998 | van Hoff | |
| 5,850,155 A * | 12/1998 | Matsumoto | 326/109 |
| 5,850,629 A | 12/1998 | Holm et al. | |
| 5,968,116 A * | 10/1999 | Day et al. | 709/202 |
| 6,182,098 B1 * | 1/2001 | Selker | 715/202 |
| 6,230,171 B1 | 5/2001 | Pacifici et al. | |
| 6,243,722 B1 | 6/2001 | Day et al. | |
| 6,377,965 B1 | 4/2002 | Hachamovitch et al. | |
| 6,470,390 B1 | 10/2002 | Westfield | |
| 6,507,865 B1 * | 1/2003 | Hanson et al. | 705/36 R |
| 6,571,295 B1 | 5/2003 | Sidana | |
| 6,658,348 B2 | 12/2003 | Rudd et al. | |
| 6,721,921 B1 | 4/2004 | Altman | |
| 6,745,161 B1 * | 6/2004 | Arnold | G06F 17/30616 704/7 |
| 6,807,574 B1 | 10/2004 | Partovi et al. | |
| 6,826,595 B1 | 11/2004 | Barbash et al. | |
| 6,859,909 B1 | 2/2005 | Lerner et al. | |
| 6,877,137 B1 | 4/2005 | Rivette et al. | |
| 6,950,982 B1 | 9/2005 | Dourish | |
| 6,966,029 B1 * | 11/2005 | Ahern | G06F 17/211 715/234 |
| 7,010,751 B2 | 3/2006 | Shneiderman | |
| 7,028,259 B1 | 4/2006 | Jacobson | |
| 7,137,071 B2 | 11/2006 | Fuller et al. | |
| 7,171,618 B2 * | 1/2007 | Harrington | G06F 17/2247 715/205 |
| 7,257,769 B2 | 8/2007 | Caspi | |
| 7,269,787 B2 | 9/2007 | Amitay et al. | |
| 7,299,407 B2 | 11/2007 | Joshi et al. | |
| 7,337,389 B1 | 2/2008 | Woolf et al. | |
| 7,389,234 B2 * | 6/2008 | Schmid | G10L 15/193 704/10 |
| 7,432,938 B1 | 10/2008 | Reuter et al. | |
| 7,503,012 B2 | 3/2009 | Chen et al. | |
| 7,523,869 B2 | 4/2009 | Helkio et al. | |
| 7,548,929 B2 | 6/2009 | Collins et al. | |
| 7,630,670 B2 | 12/2009 | Wooldridge et al. | |
| 7,680,908 B2 | 3/2010 | Gates et al. | |
| 7,707,039 B2 * | 4/2010 | King | H04N 1/00244 705/1.1 |
| 7,707,127 B2 | 4/2010 | Jhala et al. | |
| 7,755,784 B2 | 7/2010 | Parry et al. | |
| 7,756,753 B1 | 7/2010 | McFarland | |
| 7,788,248 B2 | 8/2010 | Forstall et al. | |
| 7,849,364 B2 | 12/2010 | Callender | |
| 7,970,761 B2 | 6/2011 | Petri | |
| 7,970,837 B2 | 6/2011 | Lyle et al. | |
| 7,974,940 B2 | 7/2011 | Ayloo | |
| 7,996,418 B2 | 8/2011 | Weinstein et al. | |
| 8,005,850 B2 * | 8/2011 | Walther et al. | 707/758 |
| 8,010,285 B1 | 8/2011 | Denise | |
| 8,041,746 B2 | 10/2011 | Stuhec | |
| 8,082,278 B2 | 12/2011 | Agrawal et al. | |
| 8,799,303 B2 * | 8/2014 | King | G06F 17/218 707/758 |
| 2001/0001854 A1 * | 5/2001 | Schena | G06Q 30/02 705/26.1 |
| 2004/0122843 A1 * | 6/2004 | Terris et al. | 707/102 |
| 2004/0161150 A1 | 8/2004 | Cukierman et al. | |
| 2004/0172595 A1 | 9/2004 | Lerner et al. | |
| 2004/0181517 A1 | 9/2004 | Jung et al. | |
| 2004/0181711 A1 | 9/2004 | Johnson et al. | |
| 2004/0210833 A1 | 10/2004 | Lerner et al. | |
| 2005/0071755 A1 * | 3/2005 | Harrington | G06F 17/2247 715/229 |
| 2005/0091027 A1 | 4/2005 | Zaher et al. | |
| 2005/0091578 A1 | 4/2005 | Madan et al. | |
| 2005/0114325 A1 | 5/2005 | Liu et al. | |
| 2005/0216457 A1 | 9/2005 | Walther et al. | |
| 2005/0216770 A1 * | 9/2005 | Rowett | H04L 63/101 726/5 |
| 2005/0234891 A1 * | 10/2005 | Walther et al. | 707/3 |
| 2005/0256866 A1 | 11/2005 | Lu et al. | |
| 2005/0256867 A1 | 11/2005 | Walther et al. | |
| 2006/0143208 A1 | 6/2006 | Ramachandran et al. | |
| 2006/0265652 A1 | 11/2006 | Seitz et al. | |
| 2006/0282762 A1 | 12/2006 | Diamond et al. | |
| 2006/0284744 A1 | 12/2006 | Shortland | |
| 2007/0061296 A1 | 3/2007 | Burke et al. | |
| 2007/0061384 A1 * | 3/2007 | Harrington | G06F 17/2247 |
| 2007/0118598 A1 | 5/2007 | Bedi et al. | |
| 2007/0150802 A1 * | 6/2007 | Wan et al. | 715/512 |
| 2007/0234214 A1 | 10/2007 | Lovejoy et al. | |
| 2007/0250901 A1 | 10/2007 | Meintire et al. | |
| 2007/0271262 A1 | 11/2007 | Wang et al. | |
| 2008/0005064 A1 | 1/2008 | Sarukkai | |
| 2008/0177994 A1 * | 7/2008 | Mayer | G06F 9/4418 713/2 |
| 2008/0189604 A1 | 8/2008 | Washburn et al. | |
| 2008/0195454 A1 | 8/2008 | Lee | |
| 2008/0195705 A1 | 8/2008 | Lee | |
| 2008/0250320 A1 | 10/2008 | Channell et al. | |
| 2009/0077589 A1 * | 3/2009 | Boyer et al. | 725/46 |
| 2009/0171751 A1 | 7/2009 | Zhou et al. | |
| 2009/0187825 A1 | 7/2009 | Sandquist et al. | |
| 2009/0300475 A1 | 12/2009 | Fink et al. | |
| 2010/0037149 A1 | 2/2010 | Heath | |

OTHER PUBLICATIONS

Fish, Robert S., Robert E. Kraut, and Mary DP Leland. "Quilt: a collaborative tool for cooperative writing." In ACM SIGOIS Bulletin, vol. 9, No. 2-3, pp. 30-37. ACM, 1988.*

Roseman, Mark, and Saul Greenberg. "TeamRooms: network places for collaboration." In Proceedings of the 1996 ACM conference on Computer supported cooperative work, pp. 325-333. ACM, 1996.*

"Blog Quick Start,"Desire2Learn, Mar. 11, 2008, available at <http://www.sjsu.edu/ecampus/docs/Blog_Quick_Start_v8.3.0.pdf>, retrieved May 19, 2007, 6 pages.

"Blog software comparison chart," USC Annenberg, OJR: The Online Journalism Review, May 18, 2006, available at <http://www.ojr.org/ojr/images/blog_software_comparison.cfm>, retrieved May 26, 2010, 2 pages.

(56) References Cited

OTHER PUBLICATIONS

"Blogger," Internet Archive, Way Back Machine, search result link "Dec. 11, 2006" for the Web address blogger.com, available at <http://web.archive.org/web/*/http://blogger.com>, retrieved May 18, 2010, 7 pages.
Coveney, David, "WordPress User Guide", Interconnect IT Ltd (UK), Jan. 24, 2007, Version 2, Copyright 2008 available at <http://galileoweb.org/helpdesk/files/2008/05/wordpress_user_guide_v2_beta.pdf>, retrieved May 18, 2010, 41 pages.
"Diigo Launches—More Than Just Bookmarking," Solution Watch, Jul. 25, 2006, available at <http://www.solutionwatch.com/474/diigo-launches-more-than-just-bookmarking/>, retrieved May 13, 2010, 8 pages.
"Embedded Comment Form-All Comments Below Post," Blog Bulk, Nov. 3, 2008, available at <http://www.blogbulk.com/2008/11/embedded-comment-form-all-comment-below.html>, retrieved May 14, 2010, 8 pages.
Gardner, Susannah, "Time to check: Are you using the right blogging tool?," USC Annenberg, OJR: The Online Journalism Review, Jul. 14, 2005, available at <http://www.ojr.org/ojr/stories/050714gardner/>, retrieved May 26, 2010, 7 pages.
Kay, Amanda, "Create Your Own Recent Comments Widgets Here!," Blogger Buster, Aug. 28, 2007, available at <http://www.bloggerbuster.com/2007/08/create-your-oen-recent-comments-widgets.html>, retrieved May 14, 2010, 19 pages.
"LineBuzz," Internet Archive, Way Back Machine, search result link "Jul. 7, 2007" for the Web address linebuzz.com, available at <http://web.archive.org/web/*/http://linebuzz.com>, retrieved May 14, 2010, 37 pages.
Loh, Roger, "Three Different Ways of Getting a WordPress Blog Up and Running," Blog Help, Jan. 31, 2007, available at <http://tools.devshed.com/c/a/Blog-Help/Three-Different-Ways-Of-Getting-A-WordPress-Blog-Up-And-Running/5/>, retrieved May 19, 2010, 3 pages.
Lowry, Michael, "Blogging with Blogger," Blog Help, Jul. 16, 2008, available at <http://tools.devshed.com/c/a/Blog-Help/Blogging-with-Blogger/>, retrieved May 19, 2010, 3 pages.
Purdy, Kathy, "How to Insert a Link," Blogging Art and Practice, Oct. 17, 2007, available at <http://www.yourbloghelper.com/2007/10/17/how-to-insert-a-link/>, retrieved May 14, 2010, 4 pages.
Spaulding, Joshua, "Blogging—A Guide for Beginners," Blog Help, Jan. 26, 2007, available at <http://tools.devshed.com/c/a/Blog-Help/Blogging-A-Guide-for-Beginners/>, retrieved May 19, 2010, 2 pages.
Sutherland, Andrew, "Edit Comments," WordPress, Sep. 1, 2005, available at <http://wordpress.org/extend/plugins/edit-comments/>, retrieved May 14, 2010, 5 pages.
Thomason, Larisa, "Beginner Tip: Add Comments to Your Code," NetMechanic, Sep. 2003, vol. 6 No. 17, available at <http://www.netmechanic.com/news/vol6/beginner_no17.htm>, retrieved May 14, 2010, 3 pages.

* cited by examiner

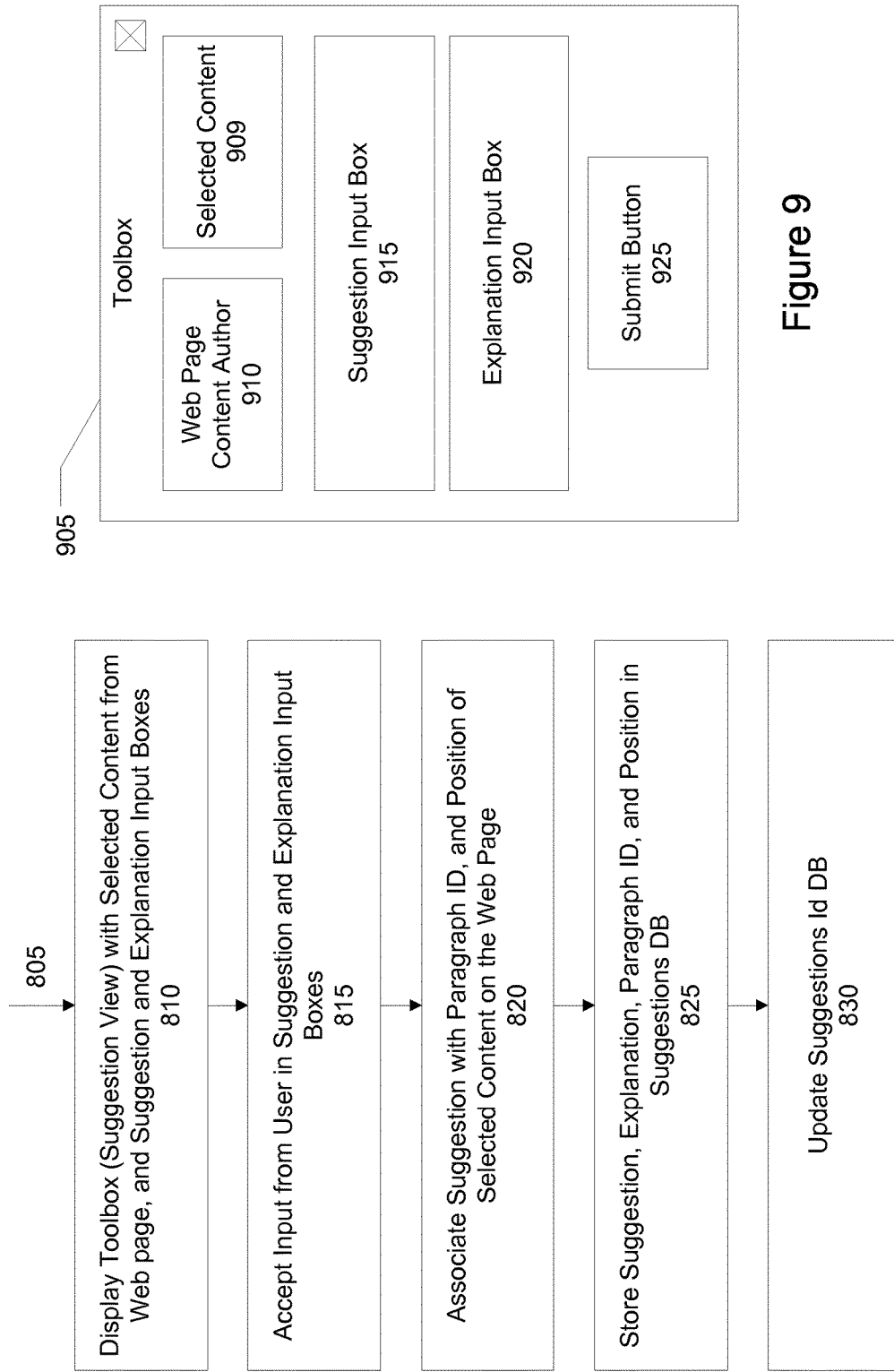

NETWORK-ACCESSIBLE COLLABORATIVE ANNOTATION TOOL

CROSS-REFERENCE TO RELATED APPLICATIONS

This patent application is a divisional of U.S. patent application Ser. No. 12/767,786, filed Apr. 26, 2010, issued as U.S. Pat. No. 8,612,469 on Dec. 17, 2013, which claims priority to U.S. provisional patent applications 61/178,933, filed May 15, 2009, and 61/172,605, filed Apr. 24, 2009, and which is a continuation-in-part of U.S. patent application Ser. No. 12/390,450, filed Feb. 21, 2009, which claims priority to U.S. provisional patent application 61/030,431, filed Feb. 21, 2008. These applications are incorporated by reference along with all other references cited in this application.

BACKGROUND OF THE INVENTION

This invention relates to the field of information networks, and more specifically to techniques of developing, providing, and sharing content in a social networking community, especially one which provides an immersive, collaborative environment for learning.

The Internet and the World Wide Web (WWW) and have brought about significant changes in how information is exchanged. The Internet has been referred to as the "information superhighway" and has facilitated rapid dissemination of information to large numbers of people in the United States and around the world. Through the Web, users can more easily "publish" or otherwise make available to others many different kinds of information and content, such as through hyperlinked pages. This information includes, naming a few examples, newspaper articles, scientific papers, literary texts, business articles, social commentaries, political commentaries, and entertainment columns.

The Internet continues to evolve and advance. The Web facilitates more than just people retrieving information from institutional sources. Information is being democratized through new sources and ways of presenting information such as weblogs or blogs, wikis, podcasts, forums, and on-line social communities. The result is a more socially connected community where people are able to publish, add, and edit content.

Through the Internet, people want to find and connect with others who share similar interests and activities. They want to learn what others know. They want to teach what they know. Therefore, there is a need for new and improved techniques for developing, providing, and sharing content, especially to support a vibrant social networking community.

BRIEF SUMMARY OF THE INVENTION

A network-accessible toolbox permits collaborative annotation, facilitating interaction and communication among users. In an implementation, content on a Web page, or other page or document accessible through a network or the Internet, can be annotated. A user can view the page and with the toolbox, select content on the page and make an annotation or suggestion. Multiple users can view and make annotations to the same page at the same time. After annotations are made, users can view the page with annotations made by other users. The author or owner of the page can accept or reject the annotations or suggestions made to the page. If the owner accepts a particular suggestion, the selected content is replaced with the suggestion.

Content on a Web page or other network-accessible page can be annotated. In a specific implementation, a Web-based toolbox or other network-accessible toolbox includes a tool for selecting a portion of content on the page and making a suggestion to the selected content. Other users can view the suggestion, the selected content, and the content. The content author or provider can accept or reject the suggestion. If the suggestion is accepted the selected content is replaced with the suggestion. In an implementation, the suggestions are stored in a separate location from the page (e.g., separate file or separate database).

In a specific implementation, the system includes a toolbox program or application that aids in on-line English education. The toolbox includes a suggestion tool (e.g., option or application). The suggestion tool may be used, for example, to suggest spelling, grammar, or punctuation edits on any typewritten text on any Web page such as Web pages on EnglishCafe.com.

That is, specific aspects of the invention are implemented at a Web site known as EnglishCafe. EnglishCafe serves a community focused on English learning. EnglishCafe may be associated with an e-learning site (e.g., GlobalEnglish) that has on-line courses for teaching students English. Each student at the e-learning site may be given the opportunity to join the EnglishCafe community site, where each student can create their own pages for others to view. Community members need not necessarily be teachers or users associated with the e-learning site.

If a suggestion is received by a blog owner, the blog owner may either approve the suggestion or discard the suggestion. The suggestion may be submitted by simply selecting the text that the user feels can be improved. Examples of users who may access one or more options of the toolbox program include EnglishCafe users, authenticated EnglishCafe users and anonymous users.

In a specific implementation, the toolbox is used to give a corrective suggestion to a blog post. The toolbox is user-friendly and easily accessible for all the users.

In this specific implementation, toolbox is accessed through the EnglishCafe.com website. When an EnglishCafe user logs into the Web site, the user is connected to the EnglishCafe server. When the toolbox is accessed, whatever data entered is saved in the database server and is retrieved from it. These data will be reflected in "suggestion given" and "suggestion received" sections of the blog or Web site. In this specific implementation, the toolbox is not a stand-alone single user system component. That is, any EnglishCafe user can make a suggestion, but only the blog owner can approve, agree, or discard the suggestion.

The various services provided to the users for the toolbox are based on the user type. In an implementation, the toolbox includes five components. The five components include make a suggestion, translate it, hear it, copy, and quote.

Authenticated users can avail all the above services provided by the toolbox. The anonymous users can only avail the services of "translate it," "hear it," and "copy" the text of the blog post.

More specifically, the make a suggestion component is used to give a suggestion to the blog owner an alternative way that they could have expressed themselves. The translate it component is used to translate a particular text of the blog to the desired language of the user. There are some pre-populated languages that have been set in the toolbox which can be used to translate. The hear it component is used to hear a particular text of the blog in the desired voice that has been selected. The copy component is used to copy a particular text of the blog and use it for reference. The quote component is used to comment on a particular text of the blog instead of the normal comment to the entire blog.

In an implementation, comments made using the suggestion tool can replace the text that is selected, after approval by the blog writer. Such an approach is not simply for commenting but also for suggesting and correcting. The tool allows for an explanation of suggestion. The tool allows for multiple suggestions on the same text. In a further implementation, the tool allows not only suggestions, but additionally a translate it feature, hear it feature, copy it feature, and quote it feature, in any combination.

In a specific implementation, a method of annotating a document includes allowing a first user to access the document. The document accessed by the first user includes content provided by a second user and embedded executable code. Using executable code of the document, detecting an indication by the first user of a first selection of text in the content. After the detecting the indication by the first user, using the executable code, seeking a first suggestion input from the first user. Storing the first suggestion input from the first user. After the storing the first suggestion input from the first user, showing the second user the first suggestion input from the first user. Presenting the second user a first option to accept the first suggestion input and a second option to reject the first suggestion input. When the second user accepts the first suggestion input, making a replacement of the first selection of text in the content, provided by the second user, of the document with the first suggestion input.

In an implementation, when the second user rejects the first suggestion input, the method includes not making a replacement of the first selection of text in the content, provided by the second user, of the document with the first suggestion input.

The showing the second user the first suggestion input from the first user may include displaying the document and the content provided by the second user to the second user. Displaying a toolbox dialog box including a first box and a second box, where the first box includes the first selection of text, the second box includes the first suggestion input, and the toolbox dialog box is superimposed over at least a portion of the document.

In an implementation, before the when the second user accepts the first suggestion input, making a replacement of the first selection of text, the method includes allowing a third user to access the document. Using executable code of the document, detecting an indication by the third user of a second selection of text in the content, where the second selection of text includes at least a portion of the first selection of text. After the detecting the indication by the third user, using the executable code, seeking a second suggestion input from the third user. Storing the second suggestion input from the third user. After the storing the second suggestion input from the third user, showing the second user the second suggestion input from the third user. Presenting the second user a third option to accept the second suggestion input and a fourth option to reject the second suggestion input. When the second user accepts the second suggestion input, making a replacement of the second selection of text in the content, provided by the second user, of the document with the second suggestion input. And, after the making a replacement of the second selection of text, not permitting the second user to accept the first suggestion input.

In an implementation, after the when the second user accepts the first suggestion input, making a replacement of the first selection of text in the content, provided by the second user, of the document with the first suggestion input, the method includes allowing a third user to access the document, where the document accessed by the third user includes content provided by the second user, the accepted first suggestion input, and embedded executable code. Using executable code of the document, detecting an indication by the third user of a second selection of text in the content, where the second selection of text includes at least a portion of the accepted first suggestion input. After the detecting the indication by the third user, using the executable code, seeking a second suggestion input from the third user. Storing the second suggestion input from the third user. After the storing the second suggestion input from the third user, showing the second user the second suggestion input from the third user. Presenting the second user a third option to accept the second suggestion input and a fourth option to reject the second suggestion input. And when the second user accepts the second suggestion input, making a replacement of the second selection of text in the content, including the at least a portion of the accepted first suggestion input, with the second suggestion input.

The method may further include seeking an explanation of the first suggestion input from the first user, storing the explanation, and during the presenting the second user a first option to accept the first suggestion input and a second option to reject the first suggestion input, presenting the second user the explanation.

Before the making a replacement of the first selection of text in the content, provided by the second user, the method may include prompting the second user to confirm the acceptance of the first suggestion input.

The method may further include when the second user accepts the first suggestion input, sending a notification to the first user to inform the first user that the first suggestion input was accepted.

In a specific implementation, a system includes a server, accessible to a set of client devices via a network. The server stores a set of documents, accessible to each of the client devices via the network. Each document includes embedded executable code, and when the code is delivered to a client device, invokes a suggestion tool application to run at the client device. The suggestion tool, executing at the client device, detects any selections a first user at the client device makes to first content of a first document delivered to the client device and requests for each detected selection of a portion of the first content a suggestion from the first user. The first content is provided by a second user.

There is a suggestions database residing on a storage device, connected to the server. The suggestions database includes an entry for each suggestion made to the first content of the first document, each entry including a suggestion field and a position field. The suggestion field includes text of the suggestion and the position field includes a position of where in the first content the suggestion was made.

There is a user content database residing on the storage device, connected to the server. The user content database includes an entry including a content field. The content field includes text of the first content, and when the second user accepts the suggestion, a portion of the text of the first content where the suggestion was made, indicated by the position, is replaced with the suggestion.

Each entry in the suggestions database may include a paragraph identifier field that references the first content in the user content database. In an implementation, the position field for each entry in the suggestions database is a first position field, and each entry in the suggestions database includes a second position field. The first position field indicates a beginning position of a detected selection, and the second position field indicates an ending position of the detected selection.

In an implementation, the suggestion tool, executing at the client device, requests for each detected selection of a portion of the first content an explanation of the suggestion from the first user. The explanation may be stored in the suggestions database. The explanation may be optional.

In a specific implementation, a method includes receiving first suggestion information for a first selected portion of content from a first client device of a first user. The content is provided by a second user. The first suggestion information includes a first suggestion for the first selected portion of the content for the second user to accept or reject.

The method includes storing in a suggestion database the first suggestion, and first starting and ending positions. The first starting position indicates a position in the content where the first selected portion begins, and the first ending position indicates a position in the content where the first selected portion ends. The first selected portion is between the first starting and ending positions.

The method further includes receiving an indication that the second user has accepted the first suggestion, after the receiving an indication, retrieving the first suggestion from the suggestion database, and inserting the retrieved first suggestion into the content at a location indicated by the first starting and ending positions, whereby the first selected portion of the content is replaced by the first suggestion.

In a specific implementation, the method further includes receiving second suggestion information for a second selected portion of content from a second client device of a third user. The second suggestion information includes a second suggestion for the second selected portion of the content for the second user to accept or reject. The method further includes storing in the suggestion database the second suggestion, and second starting and ending positions.

The second starting position indicates a position in the content where the second selected portion begins, and the second ending position indicates a position in the content where the second selected portion ends, the second selected portion being between the second starting and ending positions. The method further includes receiving an indication that the second user has accepted the second suggestion, after the receiving an indication that the second user has accepted the second suggestion, retrieving the second suggestion from the suggestion database, and inserting the retrieved second suggestion into the content at a location indicated by the second starting and ending positions, whereby the second selected portion is replaced by the second suggestion. The second selected portion may include at least a portion of the first suggestion.

In a specific implementation, the method further includes before the receiving an indication that the second user has accepted the first suggestion, receiving second suggestion information from a second client device of a third user. The second suggestion information includes a second suggestion for a second selected portion of the content for the second user to accept or reject. At least a portion of the first and second selected portions overlap.

The method further includes storing in the suggestion database the second suggestion, and after the receiving an indication that the second user has accepted the first suggestion, not permitting the second user to accept the second suggestion.

The first starting position may be a first numerical value and the second starting position may be a second numerical value, greater than the first numerical value.

The content may be stored in a user content database that is separate from the suggestion database. The suggestion database may be remote from the first client device. The online content may be stored in a user content database that is separate from the suggestion database. In an implementation, the toolbox tool is implemented as a cloud-based tool. The suggestions or annotations can be stored separately from the content itself (e.g., different files). However, the suggestions and content may reside on the same hard drive, or same folder or directory, or on different hard drivers or in different directories.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 8 shows a flow diagram for making suggestions to user provided content.

FIG. 9 shows a suggestion view of the toolbox.

DETAILED DESCRIPTION OF THE INVENTION

Figure 1:
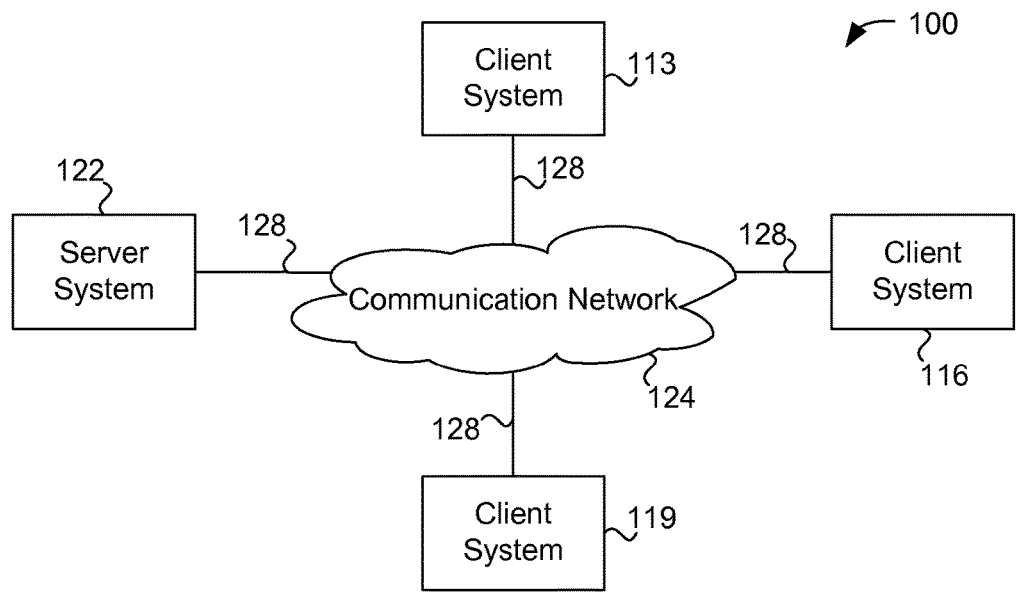
FIG. 1 shows a simplified block diagram of a client-server system and network in which an embodiment of the invention may be implemented.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser program (e.g., versions 6.0 and 7.0) provided by Microsoft Corporation, the Firefox browser provided by Mozilla, the Safari browser and Mobile Safari browser provided by Apple Corporation, the Chrome browser provided by Google, the Opera browser provided by Opera Software, and others.

Figure 2:
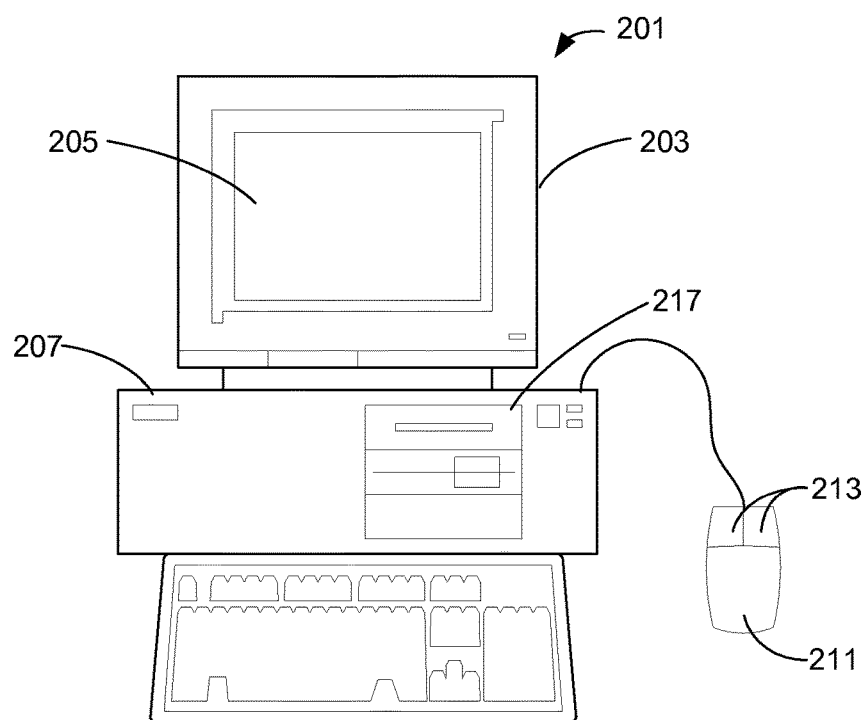
FIG. 2 shows a more detailed diagram of an exemplary client or computer which may be used in an implementation of the invention.

FIG. 2 shows an exemplary client system (or server system) of the present invention. In an embodiment, a user interfaces with the system through a computer workstation system, such as shown in FIG. 2. FIG. 2 shows a computer system 201 that includes a monitor (e.g., color monitor) 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or a computer program product. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM (e.g., 128 megabytes). Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
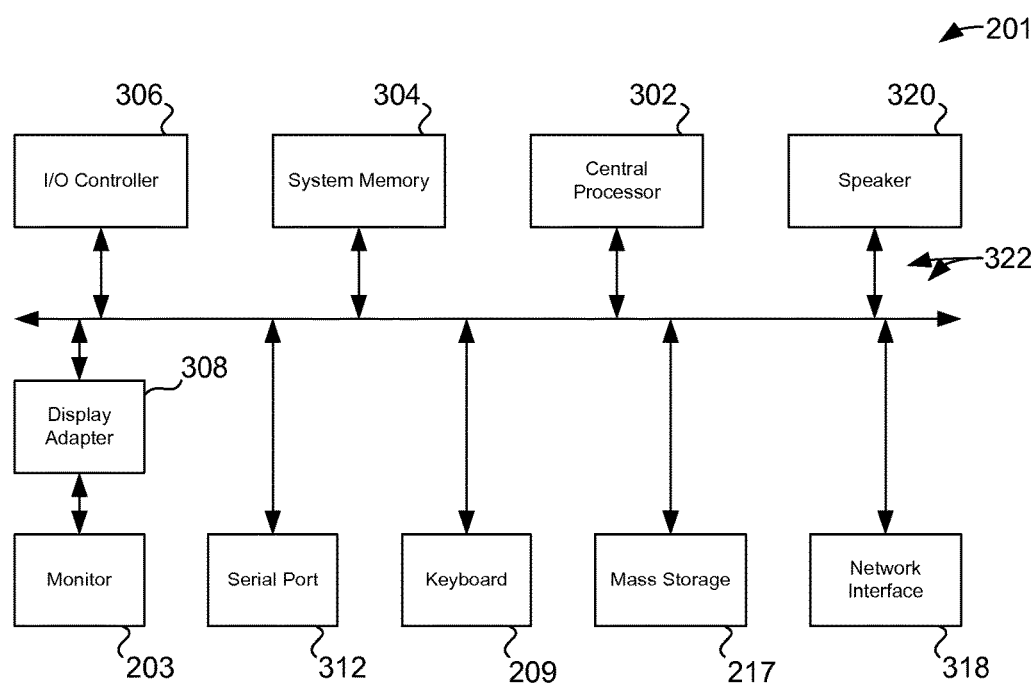
FIG. 3 shows a system block diagram of a client computer system used to execute application programs such as a web browser.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, Adobe Flash, Adobe Shockwave, or Microsoft Silverlight, or combinations of these. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X (e.g., Macintosh), Alpha OS, AIX, IRIX32, or IRIX64. Other operating systems may be used. Microsoft Windows is a trademark of Microsoft Corporation. The computer may include any number of installed drivers such as audio drivers.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download Web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web. The web browser may include any number of various plug-ins such as plug-ins for playing audio information.

A specific implementation of this invention is a social network for teaching and learning the English language. One of skill in the art would understand that the principles of the invention apply to teaching and learning other subjects, including languages other than English. The principles of the invention could apply to teaching and learning languages such as French, German, Portuguese, Korean, Russian, Turkish, Spanish, Italian, Chinese, Japanese, Arabic, and other languages. The system provides users with a virtual immersion in different languages, cultures, and customs because users can have rich, interactive experiences with other users from across the world.

Aspects of the invention may also be used to implement other types of Web sites and applications including social networking sites having various, different purposes (matchmaking, marketing, music, video, and not necessarily collaborative or e-learning), educational sites (e.g., Wiki, encyclopedia—analogous to Wikipedia), collaborative and e-learning sites, collaborative content development, collaborative review, desktop or on-line word processing applications, and others.

One of skill in the art would also understand that the principles of the invention may apply to commenting on any block of data, such as Web pages or other documents, videos, pictures, files written in HTML, or other formats (text, XML, PDF, and PostScript) and rating such comments.

In a specific implementation, the system allows users to make suggestions to a blog post. In this specific implementation, the suggestions given to a particular blog are reflected in two places including the blog owner's "suggestion received" section of the profile and the user's "suggestion given" section of the profile of the user who has made the suggestion.

Once the suggestion is received by the blog owner, the blog owner has two options to make including approve the suggestion or discard the suggestion. When the suggestion is received, the status of the suggestion will be "approval pending." Once the suggestion is approved, the status changes to "approved." If the suggestion is discarded, the status changes to "discarded." Only the blog owner is allowed to approve or discard the suggestion. The other users can only view the suggestion.

The "make a suggestion" feature is initiated when the EnglishCafe (EC) user feels that he would like to suggest an alternative way to express things that the user might have used. In an implementation, it is done by selecting the text for which the user wants to suggest and giving your suggestion to it. In a specific implementation, the user who would like to make a suggestion is an EC user.

An example of the flow to make a suggestion is as follows.

1. The EC user reads a blog post.
2. The user finds that the blog has spelling error.
3. The user wants to suggest the blog owner that the text has a spelling error.
4. The user selects the text having the spelling error using the cursor.
5. A pop-up window of toolbox opens up.
6. There are five options in the toolbox. Select the "make a suggestion" option.
7. Another window opens up which will be as displayed below.
8. The selected text from the blog will be highlighted in red in the "selected text" textbox. Beneath that is the "type your suggestion" textbox where the user should type the text that he is suggesting. By default, the cursor will be in this textbox. Beneath that is the "explain your suggestion" textbox in which the reason for the suggestion is to be filled in; however, this textbox is optional.
9. Once the details have been filled in the boxes, a "submit my suggestion" button is clicked to submit.
10. Once the suggestion is made, the toolbox will now appear on the right side of the blog with a link "current suggestion." It appears whenever a suggestion is made and allows users to make suggestions on blog post and suggestions on what others have suggested as well. From this toolbox at the right side, the user can view the suggestions made and also edit the suggestion if needed from the "edit my suggestion" option available at the top right of the suggestion window.
11. When the suggestions submitted are viewed by a user from this toolbox which is at the right side of the blog, the suggestion that is currently showing will be highlighted by a red line in the blog.
12. This option "make a suggestion" will not be enabled for an anonymous user and the blog owner.

In a specific implementation, each paragraph has a unique paragraph identifier, which is generated by server side code Personal Home Page (PHP). In this specific implantation, highlighting (e.g., underlining) the content selected by the user uses the paragraph identifier, start word count and end word count.

Once the suggestion is submitted, it will sit in the "suggestions received" section of the blog owner's profile. This suggestion will also be seen in the "suggestions given" section of the user's profile who has given the suggestion. The blog owner can then view the suggestion from the "suggestions received" and has the privilege to approve the suggestion or discard the suggestion. The status of the suggestion will be "approval pending" at the beginning when the suggestion has been submitted.

When "approval pending" is clicked, the page is directed to the blog post page where the suggestion has been given with highlighting the suggestion text by red line. The blog owner has now the option of "approve" and "discard." If the suggestion is approved, the status in the suggestions received inbox will be "approved" or "discarded" if the suggestion is discarded. In this specific implementation, only the blog owner has the rights to approve or discard the suggestion.

When the suggestions are edited by the blog owner, "suggestion history" link will be generated in the toolbox below the "current suggestion." When clicked on the suggestion history, it will show the suggestions with their status.

A suggestion given by a user may overlap with another suggestion given by another user. For example, if there is a suggestion 1 for paragraph 1 and the there is suggestion 2 for a part of paragraph 1. Initially, the status for both the suggestions will be "approval pending." When the suggestion 1 is approved by the blog owner, then suggestion 2 have the status changed to "agree pending" from "approval pending." The suggestion 1 will now have the status as "approved." It is the blog owner's decision to agree upon the suggestion 2 or discard it, accordingly the status will be changed to agreed or discarded.

When the overlapping suggestions are viewed from the "current suggestion" option of the toolbox, the current suggestion selected will be highlighted in red line and the overlapped suggestion will be highlighted in red with dotted lines.

In a specific implementation, the blog content is dynamically changed to the updated content when the page is refreshed by the user, when the suggestion is approved, discarded, agreed to, or agree pending by the blog owner, and when the toolbox is closed by the user.

In a specific implementation, the system tracks new or unviewed content and displays a visual indicator of new or unviewed content. In this specific implementation, the visual indicator includes an asterisk (e.g., orange asterisk). Thus, content which has not yet been viewed will be displayed with an orange asterisk symbol. The orange asterisk symbol will appear for every logged user for the new suggestions posed by other users.

Figure 4A:
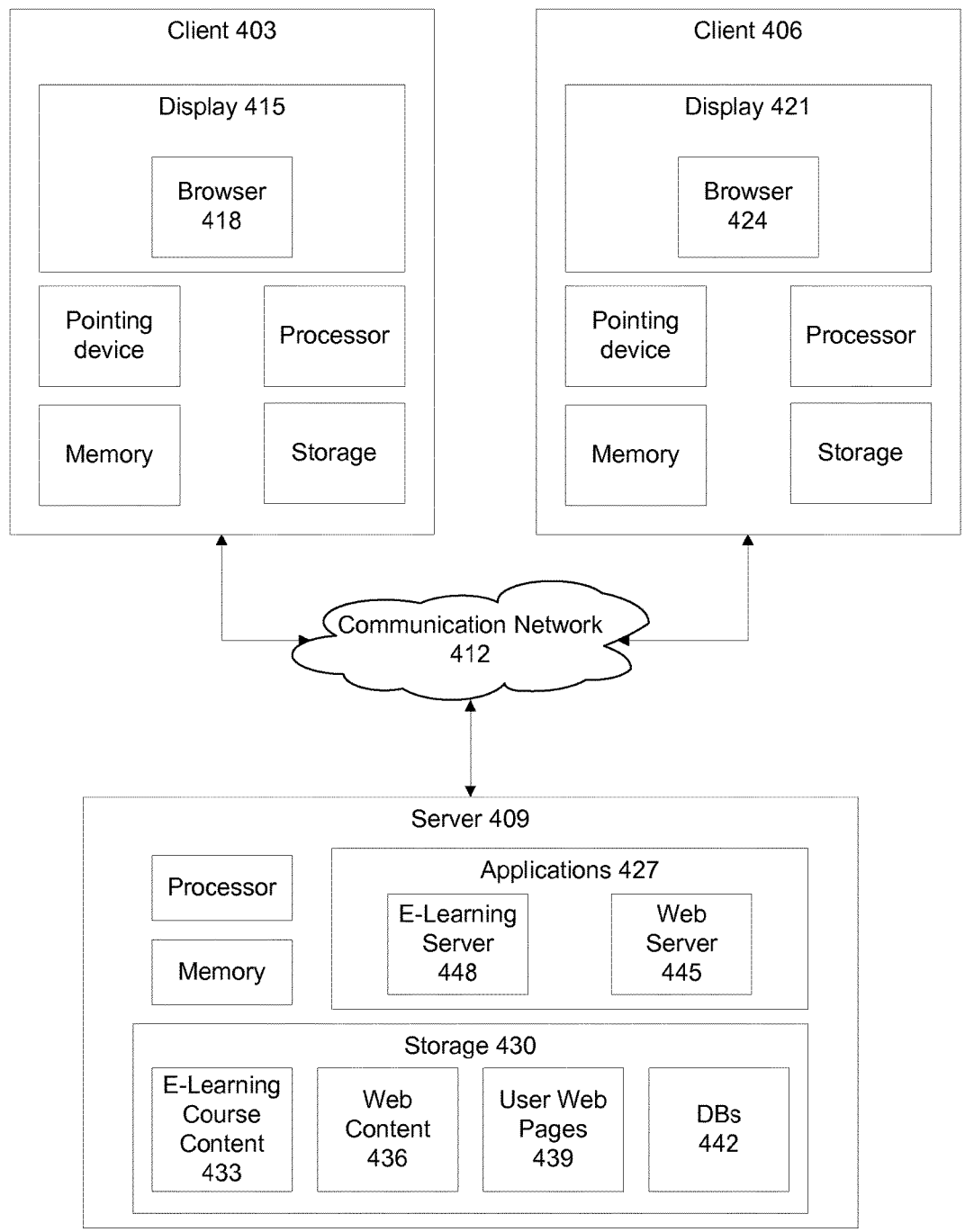
FIG. 4A shows a block diagram of a specific implementation of a system of the invention.

FIG. 4A shows a block diagram of a specific implementation of a system of the invention. This system includes any number of clients such as first and second clients 403 and 406 which access a server 409 via a communication network 412. The communication network is as shown in FIG. 1 and described above.

The clients are general purpose computers with hardware and software, such as shown in FIGS. 2-3 and described above. The clients include one or more hardware and software components described. For example, the first client includes a first display 415, a first application program 418 (e.g., first browser application program), a pointing device, processor, memory, and storage. Similarly, the second client includes a second display 421, a second application program 424 (e.g., second browser application program), a pointing device, processor, memory, and storage. The clients execute executable code (or computer-readable code) that embodies a technique or algorithm as described in this application. The browser is an application program that can request, receive, and process data from a user, the server, or both. The data can be shown via the first display.

The server includes components similar to the components shown in FIG. 3 and described above. For example, the server includes a processor, memory, applications 427, and storage 430. In a specific implementation, the storage includes e-learning course content 433, Web content 436, user Web pages 439, and databases 442. The e-learning course content is optional and is not included in other implementations.

An application such as a Web server 445 delivers Web pages (e.g., user Web pages) and other data from the storage to the browsers. An example of a Web server includes the Apache Web server from the Apache Software Foundation. In a specific implementation, the applications include an e-learning application or system 448. The e-learning application interacts with the e-learning course content to provide an e-learning or on-line learning experience for individual users. Various implementations of the e-learning application and e-learning course content are described in U.S. patent application Ser. No. 11/160,098, filed Jun. 8, 2005, and Ser. No. 11/164,726, filed Dec. 2, 2005, which are incorporated by reference along with all other references cited in this application.

Figure 4B:
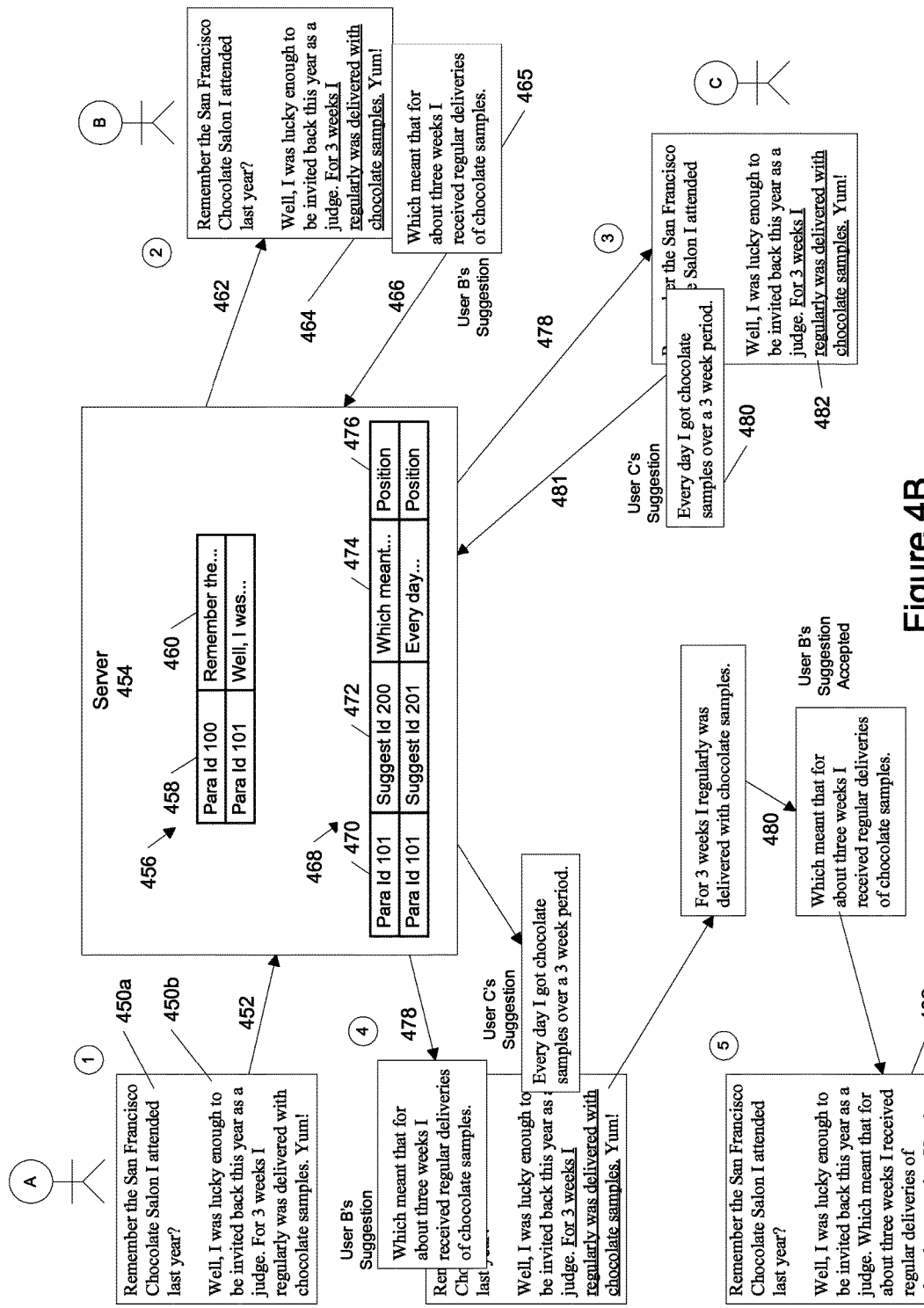
FIG. 4B shows an example of content provided by a first user being replaced with a suggestion created by a second user.

FIG. 4B shows an example of two users making suggestions to content where the content creator accepts one of the suggestions. A flow for this example is as follows. Some specific flows are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

1. First user (or user A) creates content.
2. Second user (or user B) accesses the content, selects a portion of the content, and makes a first suggestion for the selected content.
3. Third user (or user C) access the content, selects a portion of the content, and makes a second suggestion for the selected content.
4. User A accesses the stored first and second suggestions and approves one of the two suggestions.
5. The selected content is replaced with the approved (or accepted) suggestion.

More specifically, in the first step, user A is at a computer (e.g., desktop, laptop, smartphone, tablet computer, or any kind of portable or non-portable electronic device) and creates content such as paragraphs 450a and 450b. In a specific implementation, user A creates the content as part of a blog post. The content may be created using any type of input device such as a keyboard, mouse, stylus, or combinations of these. The keyboard may be a physical keyboard or keyboard that is displayed on an electronic screen such as an electronic touchscreen or touch-sensitive screen. A touch-sensitive screen may include handwriting recognition software to allow the user to provide input by writing on the touchscreen using a finger (or fingertip), digital pen, stylus, or combinations of these.

After user A creates the content, the content is transmitted 452 to a server 454. The content is stored at the server which is remote from user A's computer. In this specific implementation, the content is stored in a first database 456 (or in a table of the first database) that is at the server. The table includes a paragraph identifier field 458 and a content field 460. The paragraph identification field stores paragraph identifiers 100 and 101 which correspond to paragraphs 450a and 450b, respectively. The content field stores the content (or paragraph content) of paragraphs 450a and 450b.

In the second step, user B accesses 462 the content created by user A. For example, user B may access the content using a Web browser program that displays a document (e.g., Web page blog) which includes the content created by user A. User B may be a regular reader or follower of user A's blog. The system may send notifications to followers of user A's blog when there is new activity such as when user A makes a new blog post. Examples of notifications include e-mail, text messages, tweets via Twitter, and so forth.

User B can view, review, or read the content created by user A. When user B wishes to make a suggestion, user B selects a portion 464 of the content (shown in FIG. 4B as underlining). The system prompts, requests, or seeks a first suggestion 465 from user B. User B makes the suggestion using an input device (e.g., keyboard) and submits the first suggestion.

The first suggestion is transmitted 466 to the server and is stored at the server. In this specific implementation, the first suggestion is stored in a second database 468 (or in a table of the second database) that is at the server. The table includes a paragraph identifier field 470, a suggestion identifier field 472, a suggestion field 474, and a position field 476.

Paragraph identifier field identifies the paragraph in which a suggestion was made. In this example, the paragraph identifier field indicates that a suggestion was made in paragraph 450b which corresponds to paragraph identifier 101. The paragraph identifier may be referred to as a content identifier.

The suggestion identifier field identifies the suggestion identifier (e.g., 200) which corresponds to first suggestion 465. The suggestion field stores the first suggestion.

The position field identifies a location or position of the selected content within the paragraph. In a specific implementation, the system assigns first and second numerical values for each word in a paragraph. The first numerical value indicates a beginning position of a word in the paragraph. The second numerical value indicates an ending position of the word in the paragraph.

Thus, in this specific implementation, a number of positions within a paragraph is equal to a number of words in a paragraph plus one. Alternatively, a number of positions within a paragraph may be equal to a number of character groups in the paragraph plus one. A character group may include one or more characters or consecutive characters that are not spaces. For example, paragraph 450b which is associated with paragraph identifier 101 has 25 words (or 25 character groups) and thus has 26 positions. These positions are shown below and indicated by the bracketed numbers:

[1]Well,[2]I[3]was[4]lucky[5]enough[6]to[7]be[8]invited[9]back[10]this[11]year[12]as[13]a[14]judge.[15]For[16]3[17]weeks[18]I[19]regularly[20]was[21]delivered[22]with[23]chocolate[24]samples.[25]Yum![26]

Thus, the selected portion of the content, i.e., "For 3 weeks I regularly was delivered with chocolate samples." has a start position of [15] and an end position of [25]. The selected portion of content is between the start and end positions. The start and end positions are stored in the position field. As one skill in the art would recognize, the position field may be divided into two separate fields—a start position field and an end position field—where the start position field stores the start position and the end position field stores the end position.

Position information may be anything or any arbitrary reference that permits referencing a beginning position of a selection of content, an ending position of the selection of content, or both. For example, in another specific implementation, the system assigns a numerical value to each word in a paragraph. Using paragraph 450b as an example, the words in the paragraph are identified as follows:

[1]Well,[2]I[3]was[4]lucky[5]enough[6]to[7]be[8]invited[9]back[10]this[11]year[12]as[13]a[14]judge.[15]For[16]3[17]weeks[18]I[19]regularly[20]was[21]delivered[22]with[23]chocolate[24]samples.[25]Yum!

In this specific implementation, the word "Well," (or character group) is assigned the bracketed number [1], the word "I" is assigned the bracketed number [2], the word "was" is assigned the bracketed number [3], and so forth. Thus, the selected portion of the content, i.e., "For 3 weeks I regularly was delivered with chocolate samples." has a start position of [15] which is assigned to the word "For" and has an end position of [24] which is assigned to the word "samples."

In another specific implementation, the system assigns numerical values or references to the spaces within the paragraph for locating a selection of content within the paragraph. For example, the selected portion of content, i.e., "For 3 weeks I regularly was delivered with chocolate samples." may be referenced as being between a first space having a space assignment value of [15] and a second space having a space assignment value of [25]. In various implementations, a method includes one or more steps of assigning a numerical sequential value to each space within a paragraph where the suggestion is being made, assigning the first position a numerical value for a space within the paragraph equal to or immediately preceding the first position, assigning the second position a numerical value for a space within the paragraph equal to or immediately after the second position, assigning a numerical sequential value to each character within a paragraph where the suggestion is being made, assigning a numerical sequential value to each character within the content where the suggestion is being made, or combinations of these.

In a specific implementation, the numerical values or references are assigned at a beginning of the paragraph. However, as discussed above, position information may be anything or any arbitrary reference that permits referencing a selection of content. For example, in another implementation, a value is assigned starting at an end of the paragraph and the system counts backwards from the end of the paragraph towards the beginning of the paragraph to assign position information. In another implementation, a value is assigned starting at some arbitrary point in the paragraph, such as in a middle of the paragraph and the system counts backwards from the arbitrary point to the beginning of the paragraph, and counts forwards from the arbitrary point to the end of the paragraph to assign position information.

In a specific implementation, values (e.g., first and second numerical values) are with respect to words in a paragraph, or are with respect to a beginning position of a word and an ending position of the word. For example, using paragraph 450b as an example, the word "Well," is assigned first and second numerical values of [1] and [2], respectively. The word "I" is assigned first and second numerical values of [2] and [3] respectively. The word "was" is assigned first and second numerical values of [3] and [4], respectively.

This can help facilitate selecting content in the paragraph to make a suggestion. For example, the system detects that a user has selected a portion of a word. In a specific implementation, the system automatically selects the whole word. That is, the second numerical value that is stored is the numerical value corresponding to the end of the whole word (or the numerical value corresponding to the beginning of the subsequent word, i.e., the word after the whole word). Thus, to make a selection, the user does not have to completely select every word in the selection. This can help persons with disabilities who may not have the dexterity with an input device (e.g., mouse) to make complete selections.

In another implementation, the system automatically deselects the whole word. That is, the second numerical value that is stored is the numerical value corresponding to the beginning of the whole word (or the numerical value corresponding to the end of the previous word, i.e., the word before the whole word). This can be a benefit in cases where the user did not intend to select the word as part of the selection to make a suggestion.

In another implementation, the first and second numerical values are with respect to characters in a paragraph. That is, in this specific implementation, the system assigns for each character in a paragraph first and second numerical values. The first numerical value indicates a beginning position of a character in the paragraph. The second numerical value indicates an ending position of the character in the paragraph. Using paragraph 450b as an example, the characters in the paragraph are identified as follows:

---

[1]W[2]e[3]l[4]l[5],[6]I[7]w[8]a[9]s[10]l[11]u[12]c[13]k[14]y[15]e[16]n[17]o[18]u[19]g[20]h[21]t[22]o[23]b[24]e[25]i[26]n[27]v[28]i[29]t[30]e[31]d[32]b[33]a[34]c[35]k[36]t[37]h[38]i[39]s[40]y[41]e[42]a[43]r[44]a[45]s[46]a[47]j[48]u[49]d[50]g[51]e[52].[53]F[54]o[55]r[56]3[57]w[58]e[59]e[60]k[61]s[62]I[63]r[64]e[65]g[66]u[67]l[68]a[69]r[70]l[71]y[72]w[73]a[74]s[75]d[76]e[77]l[78]i[79]v[80]e[81]r[82]e[83]d[84]w[85]i[86]t[87]h[88]c[89]h[90]o[91]c[92]o[93]l[94]a[95]t[96]e[97]s[98]a[99]m[100]p[101]l[102]e[103]s[104].[105]Y[106]u[107]m[108]![109]

---

Thus, for example, the selected portion of the content, i.e., "For 3 weeks I regularly was delivered with chocolate samples." has a start position of [53] which is assigned to the beginning position of the character "F" in the word "For" and has an end position of [104] which is assigned to the ending position of the character "s" in the word "samples." In the above example, the spaces between words have been omitted for clarity. However, it should be appreciated that spaces may be considered to be characters and be assigned position information so that the beginning position and ending position of a space may be identified.

Assigning position information based on characters allows a user to select a portion of a word. This specific implementation can permit a user to select a portion of a word. For example, a user can select the letters "W" and "e" in which case the first and second numerical values are [1] and [3], respectively. This specific implementation may be beneficial where a user desires granularity, i.e., the ability to select one or more characters in a word. For example, if user A inputted the word "thier," user B can correct the misspelled word by selecting the characters "ie" and making the suggestion "ei."

In implementations discussed above, position information is assigned at the paragraph level or with respect to a paragraph. However, position information may be assigned at the document level. For example, in a specific implementation, the system assigns for each word in a document first and second numerical values. The first numerical value indicates a beginning position of a word in the document. The second numerical value indicates an ending position of the word in the document. For example, the document shown in FIG. 4B having the paragraphs 450a and 450b would have the following assigned position information:

---

[1]Remember[2]the[3]San[4]Francisco[5]Chocolate[6]Salon[7]I[8]attended[9]last[10]year?[11]
Well,[12]I[13]was[14]lucky[15]enough[16]to[17]be[18]invited[19]back[20]this[21]year[22]as[23]a[24]judge.[25]For[26]3[27]weeks[28]I[29]regularly[30]was[31]delivered[32]with[33]chocolate[34]samples.[35]Yum![36]

---

This specific implementation can allow for a selection to be made which spans across two or more paragraphs. For example, user B may make the selection: "attended last year? Well, I was lucky." This selection includes content from paragraph 450a (i.e., the phrase "attended last year?") and content from paragraph 450b (i.e., the phrase "Well, I was lucky"). This selection thus has beginning position of [8] and an ending position of [15]. The beginning position indicates the location of the word "attended" in the document. The ending position indicates the location of the word "lucky" in the document.

Carriage returns, tabs, or both in the document may also be assigned position information so that the system can identify where in the selection the preceding paragraph ends and the succeeding paragraph begins.

The above technique of assigning position information with respect to the document may be used to assign position information at the character level as discussed above. For example, in a specific implementation, the system assigns for each character in a document first and second numerical values. The first numerical value indicates a beginning position of a character in the document. The second numerical value indicates an ending position of the character in the document.

Further, it should be appreciated that position information may be assigned based on or with respect to two or more or all the documents in the system (e.g., position information assigned with respect to a group of documents). Position information may be assigned based on two or more paragraphs in a document (e.g., position information assigned with respect to a group of paragraphs). The paragraphs may or may not be consecutive paragraphs. Position information may be assigned based on paragraphs in separate documents. Position information may be assigned based on sentences such as by establishing a location of periods. Position information may be assigned based on documents (or paragraphs) belonging to a user, belonging to a group of users, that are of a specific type, and so forth. Position information may be assigned using information such as a line number of a line of content in a document, page, page numbers, sections, section numbers, carriage returns, tabs, punctuation marks (e.g., periods, question marks, exclamation points, colons, semicolons, dashes, em dashes, or en dashes), or combinations of these.

In examples shown above, position information includes numerical values and specifically, sequential or consecutive positive numerical integers. However, in other implementations, the values include nonsequential numbers, nonconsecutive numbers, positive numbers, negative numbers, decimal numbers, nonrepeating numbers, repeating numbers, or combinations of these.

Further, position information may instead or additionally include alphabetical characters, symbols, alphanumeric characters, punctuation marks, or combinations of these. For example, a first value [A] may indicate a beginning position of a selection of content. A second value [E] may indicate an ending position of the selection of content.

In a specific implementation, a selection includes two or more consecutive words. In another implementation, a selection includes two or more nonconsecutive words in which a user (e.g., user B) makes a suggestion for the selection.

In the third step, user C accesses 478 the content created by user A and makes a second suggestion 480. User C may access the content and make a suggestion by following a procedure similar to the procedure for user B described above in step 2. For example, when user C wishes to make a suggestion, user C selects a portion 482 of the content. The system seeks second suggestion 480 from user C. User C makes and submits the second suggestion which is transmitted 481 to the server and stored in second database 468. As shown in FIG. 4B, an entry is made in the second database for the second suggestion from user C. The entry includes the paragraph identifier (101) for which the suggestion was made, the suggestion identifier (201), the second suggestion, and the position information.

In this example, users C and B have selected the same portions of content to make a suggestion. However, users C and B do not have to necessarily select the same portions of content. User C may select a portion of content that is different from the portion of content selected by user B. For example, user C may select a portion of content from paragraph 450a, user C may select a portion of content from paragraph 450b that does not overlap the portion of content selected by user B, or user C may select a portion of content that at least partially overlaps the portion of content selected by user B.

In the fourth step, user A accesses 484 the first suggestion from user B and the second suggestion from user C. User A may receive a notification that a suggestion has been made to the blog post. The notification may include a link to the blog post. User A can navigate to the blog post, select a link to view suggestions, and the suggestion will be displayed on user A's computer screen. User A can review the suggestion and decide whether to approve (i.e., accept) or reject the suggestion.

That is, user A can review the first and second suggestions and decide which of the two suggestions to accept. User A may also decide to not accept any suggestions, i.e., reject the first and second suggestions.

In the fifth step, when user A accepts one of the first or second suggestions, the selected content is replaced 486 with the selected suggestion. In this example, user A has accepted the first suggestion from user B. The system, upon receiving an indication of an acceptance of the first suggestion, replaces the selected content with the first suggestion.

In a specific implementation, the replacement operation may include the following substeps:

5.1. Identify in first database 456 the paragraph (e.g., paragraph 450b) in which the suggestion was made using the paragraph identifier (e.g., paragraph identifier 101) that is associated with the first suggestion from second database 468.

5.2. Identify a location within the paragraph of the selected content using the start position (e.g., [15]) and end position (e.g., [25]) of the selected content.

5.3. Extract from the paragraph the content between the start and end positions—the extracted content being the selected content.

5.4. Insert the first suggestion between the start and end positions.

5.5. Store the updated paragraph with the first suggestion having replaced the selected content in the first database.

When users navigate to user A's blog post or otherwise access the blog post, the users will see a document or Web page 488 having the updated paragraph. In a specific implementation, an operation where the selected content is replaced by the first suggestion includes inserting the first suggestion into the first paragraph and deleting the selected content from the first paragraph. The deleting the selected content may be before, after, or during the inserting the first suggestion into the first paragraph. The selected content may be overwritten by the first suggestion. In another specific implementation, the operation where the selected content is replaced by the first suggestion includes swapping the selected content in the first paragraph with the first suggestion.

As discussed above and elsewhere in this application, a feature of a specific implementation of the invention is to allow collaboration of multiple users to view and make suggestions on the same document. In such an implementation, the user will not receive a message such as "document is locked for editing (or viewing) by another user." The content creator may be editing the content, while other users is reviewing and making comments or entering suggestions at the same time as each other, or different times. For example, a first user may enter a suggestion at the very same time the second user is entering a different suggest to the same page, or even the same selected text. The database organization that facilitates this feature is described in FIG. 5 and the accompanying text, and elsewhere in this application.

Further, a user may view, access, and accept suggestions even if the users who made the suggestions are not connected or are disconnected from the system or network. The suggestions are stored or saved in for example, a database or file (see FIG. 5 below and accompanying text). In a specific implementation, user A accesses or views user's B's suggestion. While user A is viewing or accessing user B's suggestion, user B can be disconnected from the system. When user B is disconnected from the system, user A accesses B's suggestion as it was saved in the database or file. User may choose to password protect, encrypt the document, or other protect the document so that the document is viewable by only selected users (e.g., particular groups or friends of user A, which are authorized by A). In another implementation, user A can send user B (and perhaps many other people) an e-mail with a link to the document. After hitting the link, if user B is not recognized as being authorized to view the document, the system can send a message to A inquiring whether B is allowed to access. Then, the users (B and perhaps many others) can review the document and make any comments or suggestions, without conflict or waiting for others to finish making their comments. The document can be viewed through, for example, an SSL encrypted link (or other encryption technology including RSA, HTTPS, and so forth), where an SSL or other certificate is used to securely link B to the document. Any suggestions of comments user B makes will be encrypted, so eavesdroppers cannot see the document or comments. User B can also use one or multiple languages in making the comments. The system of the invention may operation in one or multiple languages including English, French, German, Spanish, Chinese characters, Japanese characters, Mandarin, Korean, and others.

Similarly, users may make suggestions to content even if the content creator is disconnected from the system. In a specific implementation, user B makes a suggestion to content created by user A. User A may also be also referred to as the content organizer, content moderator, content owner, content creator, content provider, creator, owner, author, page administrator, page master, provider, or other terms. In this patent, user A is a user who has the authority to authorize adding, deleting, replacing, and changing of content. Although user A may be referred to as a content author or content owner, user A may not actually have created the content or be the author. For example, user A may include some passages from Charles Dickens or Jules Verne on user A's page. Rather user A is an owner of the page, so user A has the authority to choose what content is include on user A's pages, and whether any changes (e.g., via suggestions) can be made to that page. In a particular implementation, user A may grant privileges to other users, which may be referred to as subordinate page owners who are given the ability to accept or decline changes to a page. Content may also have joint owners: If two or more users can authorize changes where an authorization from any one of the joint owners approves changes. In some other implementations, every joint owner must agree to authorize before a change will be made. In some other implementations, a majority or quorum of joint owner must agree to authorize before a change will be made.

While user B is making the suggestion, user A is disconnected from the system. These features of the system can help to facilitate collaboration among users who may have different work schedules, working remotely from the office, be in different time zones or parts of the world. For example, user A who may be in California, can view and accept a suggestion made by user B who may be asleep in Russia and not connected to the system, i.e., off-line or not online. User B can make a suggestion to content created by user A while user A is asleep and not connected to the system.

Thus, in this specific implementation, users can make suggestions to content while the content creator is not connected to the system. A user can view suggestions, accept suggestions, or both while the users who made the suggestions are not connected to the system. In various other implementations, both user A who created the content and user B who made the suggestion to the content must be connected to the system for user A to view the suggestion, accept the suggestion, or both. User A who created the content must be connected to the system for user B to make a suggestion to the content.

In a specific implementation, user B selects a first portion of content to make a first suggestion, user C selects a second portion of content to make a second suggestion, and the first and second portions at least partially overlap. After user A accepts one of the first or second suggestions to replace one of the first or second portions, user A is not permitted to later accept the not accepted first or second suggestion. In other words, the system does not make a replacement of one of the first or second portions with the not accepted first or second suggestion. The system may send a notification to the user whose suggestion was accepted to inform the user that the suggestion was accepted. The system may send a notification to the user whose suggestion was not accepted to inform the user that the suggestion was not accepted.

In another implementation, after user A accepts one of the first or second suggestions to replace one of the first or second portion, user A is permitted to later accept the not accepted first or second suggestion. When user A later accepts the not accepted first or second suggestion, the system undoes the replacing of the first portion with the first suggestion and replaces the second portion with the second suggestion. This feature may be helpful when, for example, user A changes her mind and decides that even though she accepted one of the suggestions, user A now prefers the other suggestion.

In a specific implementation, a user can make a suggestion to a portion of content where the portion of content includes at least a portion of another suggestion. For example, in this specific implementation, user B selects a first portion of content to make a first suggestion. User A accepts the first suggestion and the first portion of content is replaced with the first suggestion. After the first portion of content is replaced with the first suggestion, user C selects a second portion of content to make a second suggestion. The second portion of content includes at least a portion of the first suggestion. User A accepts the second suggestion and the second portion of content is replaced with the second suggestion.

A user may be able to edit her suggestion after the suggestion is submitted and before the suggestion is accepted. For example, user B selects a portion of the content and makes a first suggestion. Before user A accepts the first suggestion, user B decides that she want to suggest something different from the first suggestion or edit the first suggestion. User B edits the first suggestion. In a specific implementation, user A is permitted to access the edited first suggestion, but not the unedited first suggestion. When user A accepts the edited first suggestion the edited first suggestion replaces the selected portion of content. In another implementation, user A is permitted to access the edited first suggestion and the unedited first suggestion. User A can accept one of the edited first suggestion or unedited first suggestion. When user A accepts one of the edited first suggestion or unedited first suggestion, the selected portion of content is replaced with the accepted edited first suggestion or unedited first suggestion.

The example shown in FIG. 4B shows two users (users B and C) making suggestions to content created by another user (user A). However, it should be appreciated that there can be any number of users making suggestions to content created by another user. For example, there can be three, four, five, six, seven, eight, nine, ten, or more than ten users making suggestions to the content created by user A.

Further, a user may make any number of suggestions. For example, user B may make a third suggestion to the content created by user A. User B may make a third suggestion to a selected portion of content where the selected portion of content may include at least a portion of a suggestion from user C, user B, or both. User B may make two or more suggestions to a selected portion of content so that user A can select from among the two or more suggestions. For example, user B may which to provide user A with several alternative suggestions. Thus, user B selects a portion of content created by user A and makes first and second suggestions. User A access the first and second suggestions and selects one of the first or second suggestions. The portion of content is replaced with the selected first or second suggestion.

A feature of the system is to help facilitate interaction, participation, and collaboration among members of a community or social community. In a specific implementation, this feature is implemented in a social networking community and provides an immersive and collaborative environment for learning a new language. The system makes it easy for user A to incorporate or use a suggestion from user B. Thus, user B who is reviewing content created by user A may feel more inclined to participate and offer meaningful and helpful suggestions.

The system may include features such as public discussion groups, private discussion groups (e.g., a my friends group), e-mail, instant messaging, video chat, photo and video albums, a question and answer forum, or any other social networking tool, or combinations of these. Such tools can allow users to share ideas, activities, events, and interests. These tools can provide a way for users to connect with other users having similar interests. Thus, users may see or interact with other users in a variety of contexts on the system. This can further develop a sense of trust among the community members and foster a sense of belonging to a community, which in turn further promotes collaborative interaction.

In a specific implementation, the system includes a ratings mechanism which keeps track of which suggestions were accepted, which users made the accepted suggestions, and assigns a point to a user whose suggestion was accepted. The ratings mechanism may allow users to rate or grade the suggestions made by other users.

This can foster a friendly spirit of competition among members of the community to see who can receive the most points or highest score. Since points are awarded for accepted suggestions and are not awarded for unaccepted suggestions, this can further help to encourage users to make meaningful and helpful suggestions, which in turn encourages users to further create content to be reviewed.

Users having a high number of points may be recognized by having their names displayed on a scoreboard or leaderboard Web page of the system for other users to see and admire. Users having a high number of points may be redeem their points for prizes or be awarded prizes such as cash, electronic gadgets, toys, books, candy, or other goods, products, or services. This can further incentivize users to participate through meaningful and helpful suggestions.

As one of skill in the art would recognize the implementation discussed above is merely one particular implementation for making a suggestion (or annotating) a portion of content and replacing the selected content with the suggestion or annotation. In a specific implementation, content is identified by sentence. In another specific implementation, instead of using position information in a paragraph to identify selected content, the system performs a text matching search. For example, the selected content within a paragraph may be copied and stored. When the selected content is to be replaced with the suggestion, the system may perform a text search of the paragraph using the selected content to identify which text should be replaced with the suggestion.

In a specific implementation, the system is designed so that users select whole words rather than a portion of a word. This can help to ensure that suggestions are meaningful since a suggestion to a portion of a word may not be helpful. In another implementation, the system is designed so that a user can select a portion of a word. For example, position information in a paragraph may correspond to the position of individual characters in a paragraph, rather than words in a paragraph, so that the user can select a portion of a word. In a specific implementation, users make selections within a paragraph. This can help to ensure that suggestions do not become too unwieldy (i.e., user makes a selection having 500 words). In another implementation, users can make a selection across two or more paragraphs.

In this specific implementation, the content includes text. In other implementations, the content includes audio, video, images, pictures, or combinations of these. If, for example, the content includes a video, the selected content may be identified by one or more frames of the video. A selected portion or fragment of the video may be identified by a begin time of the video fragment and an end time of the video fragment. If the content includes audio or an audio track, for example, a selected portion of the audio track may be identified by a begin time of the audio fragment and an end time of the audio fragment.

In a specific implementation, the system can automatically select a whole or entire word, a whole sentence, or a whole paragraph. For example, in various implementations, user B selects a word and clicks (e.g., click or double clicks on the word) and the system selects the whole word. User B selects a portion of a sentence and clicks (e.g., click or double clicks on the sentence) and the system selects the whole sentence, user B selects a portion of a paragraph and clicks (e.g., click or double clicks on the selected portion of the paragraph) and the system selects the whole paragraph. If the selection spans two or more paragraphs, the system selects the entire of the two or more paragraphs.

This can help speed the time it takes for a user to select whole words, sentences, or paragraphs. For example, the user does not have to drag their mouse over the whole word. To detect a whole word, the system can detect the beginning and ending position of a word by selecting backwards from the selected portion of the word until a space before the word is reached and selecting forwards from the selected portion of the word until a space after the word is reached. To detect a whole sentence the system can select backwards from the selected portion of the sentence until a period is reached, a capital letter is reached, a set of double spaces is reached, or anything else that would indicate the end of the previous sentence. The system can then select forwards from the selected portion of the sentence until an indication that an end of the sentence has been reached. The beginning and ending positions of sentences can be determined by looking for or searching for punctuation marks (e.g., periods, exclamation points, question marks, and the like). To detect the beginning and ending positions of a paragraph, the system can search for tabs, carriage returns and so forth that would indicate, for example, the end of a previous paragraph and the beginning of a subsequent paragraph.

In a specific implementation, users can insert carriage returns in their suggestions. When the suggestion is accepted the carriage return appears in the updated content.

In a specific implementation, a user after making a selection can make two or more alternative suggestions. For example, user B can select a portion of the content. The system the prompts user B for a first suggestion and a second (i.e., alternative) suggestion. The system stores both suggestions. User A can then accesses the first and second suggestions and decide which one, if any, to accepted. The selected portion of content will be replaced with the accepted suggestion.

Figure 5:
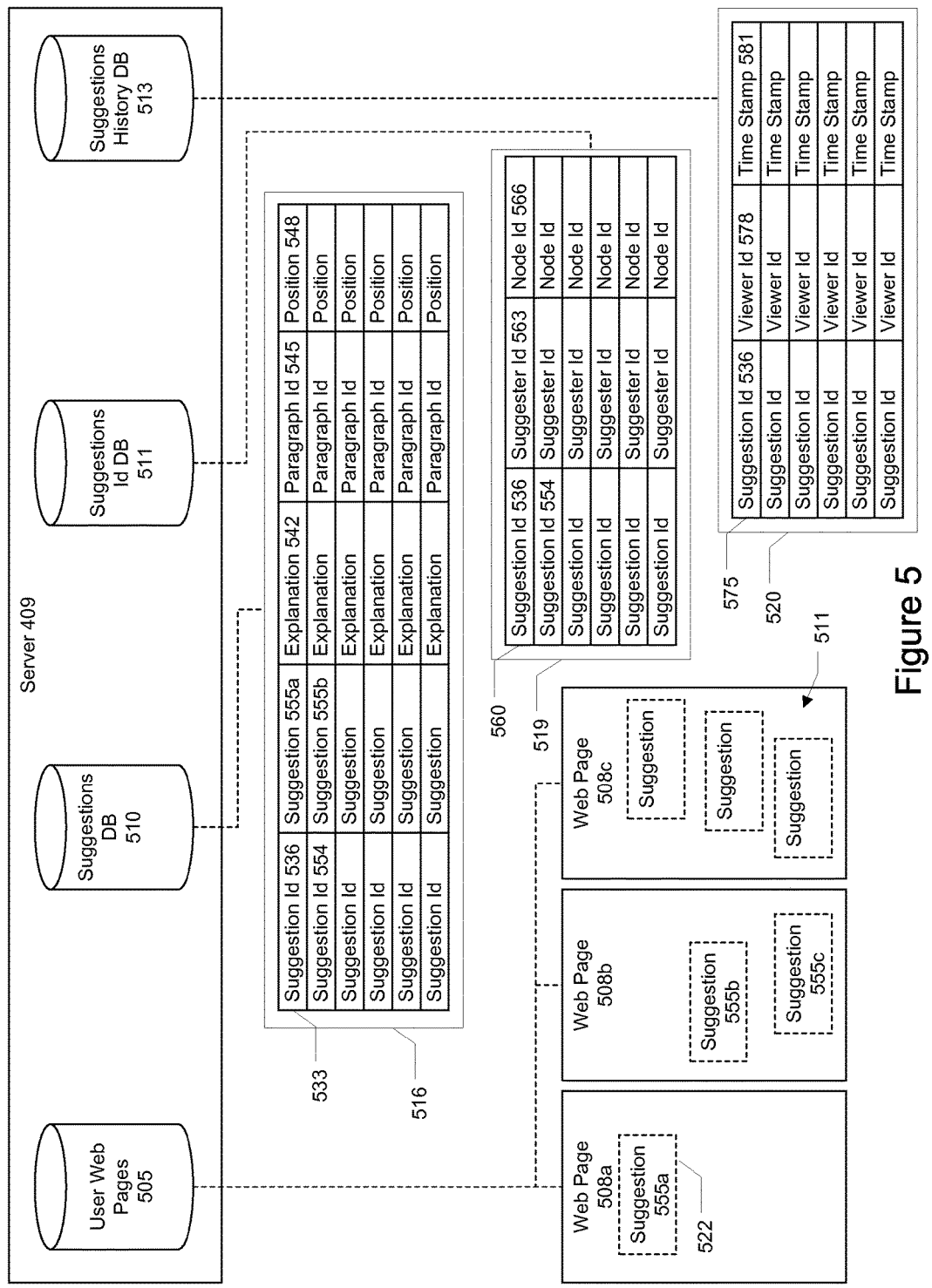
FIG. 5 shows a specific implementation of some of the various data structures to store information.

FIG. 5 shows a specific implementation of various data structures for some of the information stored in the storage of the server shown in FIG. 4A and shows some further details of the example shown in FIG. 4B. Server 409 includes a storage 505 for user Web pages, such as Web pages 508a, 508b, and 508c, a suggestions database 510, a suggestions identification database 511, and a suggestions history database 513.

The Web pages show examples of suggestions 511 having been made at various specific locations within the Web page. A suggestions table 516 shows a data structure used to store information such as suggestions in the suggestions database. A suggestions identification table 519 shows a data structure used to store information in the suggestions identification database. A suggestions history table 520 shows a data structure used to store information in the suggestions history database. The tables can include any number of fields.

In an implementation, when user B makes suggestions to user A's document. A's document is stored in user web pages 505, while user B's suggestion is stored in suggestion database 510, which are separate files or locations. This means that the suggestion is not stored with the document to which the suggestion was made. This organization of the data allows multiple users to view, edit, and make suggestions at the same time. So users will not receive a file is locked message, that disallows their making edits or suggestions. Also in this example, web pages 505 is referred to a "web" pages. The invention does not only apply to "web" pages, but also to other types of documents, not just only web pages. These documents can be accessible through the Internet or other network, such as an intranet.

In a specific implementation, the suggestions table stores suggestions. The suggestions identification table identifies the user who made the suggestion and the type of user-generated content (e.g., blog entry or forum post) that the suggestion is associated with. The suggestions history table tracks which users viewed the suggestion and when the user viewed the suggestion.

In this specific implementation, the tables are each in separate databases. However, in another specific implementation, the tables are in a single database. The single database is a common database (e.g., MySQL version 5.0.5) which stores the suggestion, suggestion identification, and suggestions history tables. A SQL database is merely one type of database and other databases or file structures may be used including database products from Oracle, Microsoft, IBM, and Google (e.g., Google spreadsheet).

The system allows users to create content. This user created content is then displayed on a Web page such as Web page 508a for other users to see. The system allows one or more of these other users to select a portion of the content at a specific location 522 within the content, and make an annotation or suggestion 555a (e.g., remark or comment) to that selected content.

Users can see the suggestions made by other users and identify which portion of the content the suggestion is associated with. The user who authored or created the content (i.e., content author) can review the suggestion and, if desired, make changes or edits to the suggestion. The content author can then accept (e.g., approve) or reject (e.g., discard) the suggestion. If the content author accepts the suggestion the system replaces the selected portion of the content with the suggestion. The user created content on Web page 508a is updated such that the portion of the content at the specific location within the content is removed or no longer visible having been replaced with the suggestion. If the content author rejects the suggestion the Web page stays the same. That is, the system does not replace the portion of the content with the suggestion.

Any number of suggestions can be made by any number of users to any number of user created content. Furthermore, any number of suggestions can be made by any number of users to a selected portion of the content. That is, two or more suggestions can be made to the same portion of content. This can be referred to as overlapping suggestions.

The user created content can be in any format or medium and can include text, video, audio, images, pictures, graphics, or combinations of these. In a specific implementation, the user created content includes text inputted as part of a blog. Similarly, the suggestions include text. A suggestion is associated with a specific portion of the blog text which is at a specific location within the blog text.

In the example shown in FIG. 5, the tables include six entries. Each entry is associated with one of the six suggestions shown on Web pages 508a, b, and c. In this specific implementation, suggestions table 516 includes a suggestion identifier field, a suggestion field, an explanation field, a paragraph identifier field, and a position field.

An entry 533 in suggestions table 516 includes a suggestion identifier 536 in the suggestion identifier field, a suggestion 555a in the suggestion field, an explanation 542 in the explanation field, a paragraph identifier 545 in the paragraph identifier field, and a position 548 in the position field.

The suggestion field includes a text string (e.g., ASCII text string) that represents the suggestion inputted by the user. The user inputting the suggestion may be referred to as the suggester. Input may be typed in using a keyboard, keypad, stylus, or other human input device, or may also be entered using other techniques, such as selecting from among some displayed suggested choices, or combination of suggested choices; scanned, video, camera or photo input, and video or image (e.g., picture or photo) to text conversion; or voice recognition or real-time speech recognition. U.S. Pat. Nos. 6,453,290, 6,865,536, 7,330,815, and 7,689,415, which are incorporated by reference, describe network-based speech recognition. Speech or voice recognition may be performed by the device, where the recognition routines are executed (at least in part or entirely) on the device.

The explanation field includes a text string that represents the explanation inputted by the suggester (i.e., suggester explanation for the suggested text). That is, when the suggester makes the suggestion the system allows the suggester to input an explanation or reason for the suggestion. Inputting the explanation is optional. The suggester can submit a suggestion without having to input an explanation. In this case the explanation field for this entry in the table will be empty.

The suggestion identifier and paragraph identifier fields may include unique series of numbers, characters, letters, or combinations of these (e.g., alphanumeric). Each of the suggestions may be associated with a unique suggestion identifier. This allows referencing a suggestion via its suggestion identifier. As an example, suggestion identifier 536 is associated with suggestion 555a. A suggestion identifier 554 is associated with suggestion 555b, and so forth. The suggestion identifier is generated automatically for every suggestion made.

In this specific implementation, the suggestion identifier may be unique across all of the suggestions. Thus, a first suggestion identifier for suggestion 555a in Web page 508a will be different from a second suggestion identifier for suggestion 555b in Web page 508b and different from a third suggestion identifier for suggestion 555c in Web page 508b.

The second suggestion identifier will be different from the third suggestion identifier. In another implementation, the suggestion identifier is unique with respect to a specific Web page. Thus, in this specific implementation, the first suggestion identifier, which is associated with suggestion 555a in Web page 508a, may the same as the second suggestion identifier, which is associated with suggestion 555b in Web page 508b.

Each of the paragraphs may be associated with a unique paragraph identifier. This allows referencing a paragraph via its paragraph identifier. A Web page can have any number of paragraphs.

In this specific implementation, the paragraph identifier is unique across all the paragraphs in all of the Web pages. Thus, a first paragraph identifier is associated with a first paragraph in Web page 508a. A second paragraph identifier is associated with a second paragraph in Web page 508a. A third paragraph identifier is associated with a third paragraph in Web page 508b. The first paragraph identifier is different from the second and third paragraph identifiers. The second paragraph identifier is different from the third paragraph identifier. In another implementation, the paragraph identifier is unique with respect to a specific Web page. Thus, in this specific implementation, the first paragraph identifier is different from the second paragraph identifier, but may be the same as the third paragraph identifier.

The position field includes integer values. In a specific implementation, the position includes a start position field and an end position field. The start position indicates a start position of a selected portion of content (e.g., a start position of a selected text within a paragraph). The end position indicates an end position of the selected portion of content (e.g., an end position of the selected text within the paragraph).

In a specific implementation, the number of positions within a paragraph is equal a number of words in a paragraph plus one. For example, a paragraph having four words will have five positions. A first word of the paragraph starts at a first position and ends a second position. A second word of the paragraph starts at the second position and ends at a third position. A third word of the paragraph starts at the third position and ends at a fourth position. A fourth word of the paragraph starts at the fourth position and ends at a fifth position.

In this specific implementation, the selected text can include any number of consecutive words within the paragraph. For example, a first selected text can include the first word. A second selected text can include the first, second, and third word. A third selected text can include the second and third word, and so forth. Thus, the first selected text will have a start position at the first position and an end position at the second position. The second selected text will have a start position at the first position and an end position at the fourth position. The third selected text will have a start position at the second position and an end position at the fourth position.

In other implementations, a selected text includes any number of nonconsecutive words, a combination of consecutive words and nonconsecutive words. The selected text may include one or more words, characters, letters, spaces, symbols, punctuation marks, word dividers, or any type of typography, and combinations of these. The selected text can include content from two or more paragraphs. The two or more paragraphs may be consecutive or nonconsecutive.

In a specific implementation, suggestions table 516 includes five fields or columns. These five fields and a brief description of each field are shown below in table A.

TABLE A

| Field Name | Description |
| --- | --- |
| Original_content | The original text for which a suggestion has been made. |
| blog_owner_suggestion | Content author's (or owner's) edited suggestion. |
| Status | In a specific implementation, there are five types of values. A value of 0 indicates a new suggestion (i.e., newly received suggestion). A value of 1 indicates the suggestion was approved. A value of 2 indicates the suggestion was discarded. A value of 3 indicates the suggestion was agreed to. A value of 4 indicates agreement to the suggestion is pending. |
| Date | The date a suggestion was posted (i.e., made or submitted). |
| Updated_date | Date of any updates done to the suggestion. Some examples include a date when the suggester edited their suggestion. A date when the author of the content approved, discarded, agreed with, or edited the suggestion. |

Suggestions identification table 519 includes the suggestion identifier field, a suggester identifier field, and a node identifier field. An entry 560 in the suggestions identification table includes suggestion identifier 536 in the suggestion identifier field, a suggester identifier 563 in the suggester identifier field, and a node identifier 566 in the node identifier field.

The suggester identifier and node identifier fields include unique series of numbers, characters, letters, or combinations of these (e.g., alphanumeric). The suggester identifier indicates the user identification of the user who posted the suggestion.

In a specific implementation, the node identifier is a unique number for user-generated content (e.g., blog, video, audio, document, photo, forum comment, question, answer, user-created group, and so forth). The node identifier is cross-referenced with a node table to determine the user identification of the creator of the node. In a specific implementation, the node table includes the user-created content in a body field of the table. An example of the fields in the node table with descriptions for each field is shown in table B below.

TABLE B

Figure 7:
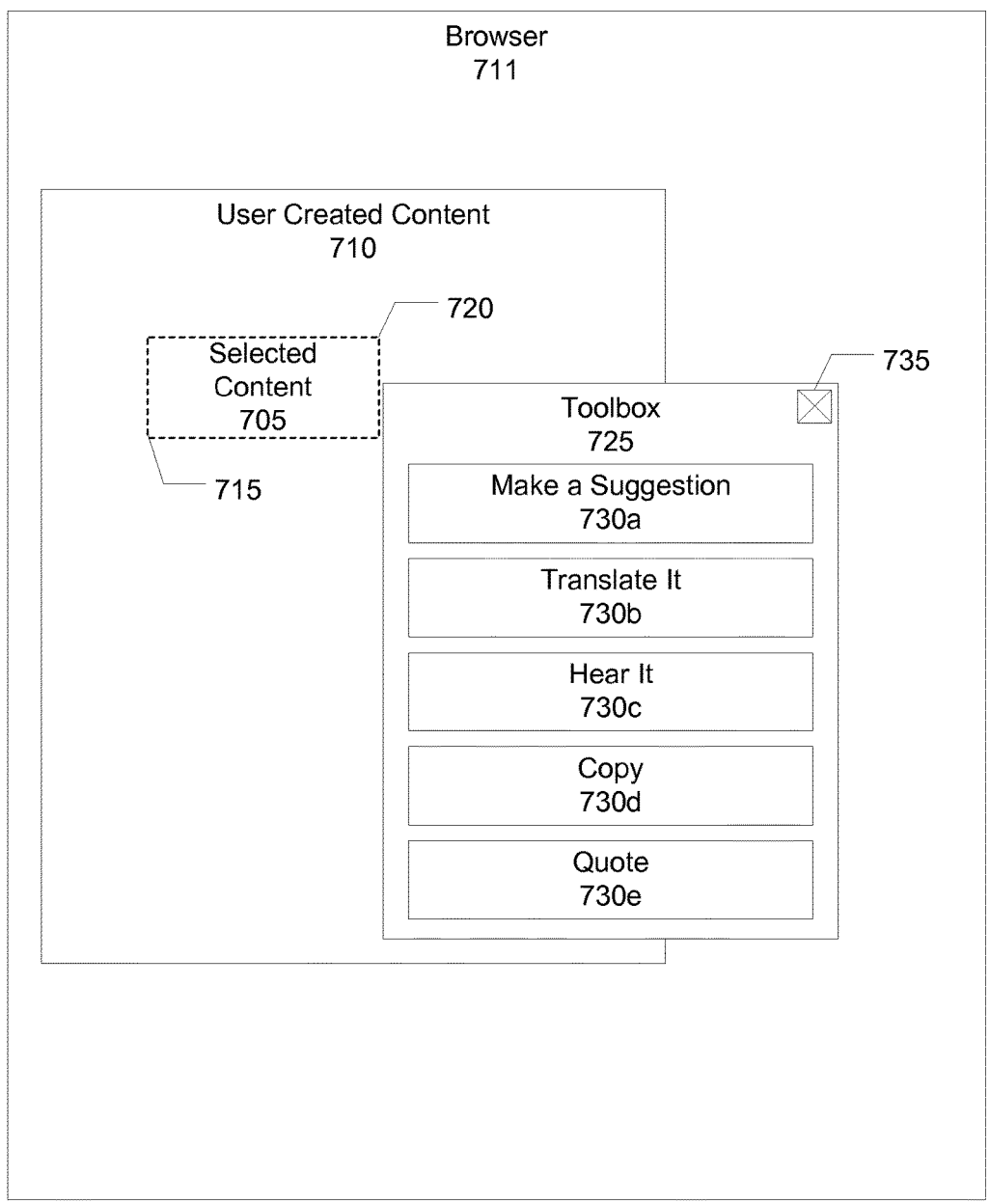
FIG. 7 shows an example of the toolbox being invoked when a user selects a portion of content.

| Field Name | Description |
| --- | --- |
| Nid | Node id. |
| Vid | Vid is a verify reference number. |
| Uid | (user id) Owner of the node id. |
| Title | Title of the node id, for example: blog title. |
| Body | Description of the title, for example: blog content. In a specific implementation, the body includes the user created content 710 (FIG. 7). In a specific implementation, the body column can be updated with the selected content (e.g., selected text) when the suggestion is approved at the status of the suggestion is changed to 1 in the suggestions table. In this specific implementation, the column is not updated to the suggested text when the suggestion gets discarded, agreed to, or agree pending. |
| Teaser | Short note of the body. |
| Log | This is site super admin usage, he can post log message about the related node. An explanation of the additions or updates being made to help other authors understand your motivations. |
| Timestamp | Node created date and time (timestamp). |
| Format | Default (allow all) = 0, Filtered html = 1, php code = 2, full html = 3. |

In this specific implementation, changes or revisions to user-generated content is tracked using a node revisions table. An example of some of the fields that may be included in the node revisions table is shown in table C below.

TABLE C

| Field Name | Description |
| --- | --- |
| Nid | Node id. |
| Vid | Vid is a verify reference number. |
| Type | Type of the content. |
| Title | Title of the content. |
| Uid | (user id) Owner of the node id. |
| Status | Status of the node id. |
| Created | Node created date and time (timestamp). |
| Changed | The timestamp will update when it gets any update. |
| Comment | Number of comment's count added for this node id. |
| Promote | Promote home page. |
| Moderate | This is for site super admin purpose(default = 0, moderate = 1). |
| Sticky | This is for site super admin purpose(default = 0, sticky = 1). |
| Download_count | Down load count of a node id. |
| Admin_feat | This is for site super admin purpose(default = 0, admin_feat = 1). |
| Privilege | This is for site super admin purpose(default = 0, privilege = 1). |
| Draft_status | This is for blog and news letter(default = 0, if draft = 1). |
| Featured | Set featured node(default = 0, featured = 1). |

Thus, the suggestions, suggestions identification, suggestion history, node, and node revisions tables shown above can be cross-referenced to determine, for example, the user who submitted or posted the suggestion, the paragraph that the suggestion is associated with, the start and end position of the text in the paragraph that the suggestion is associated with, and the author of the paragraph.

Suggestions history table 520 includes the suggestion identifier field, a viewer identifier field, and a time stamp field. The viewer identifier field includes a unique series of numbers, characters, letters, or combinations of these (e.g., alphanumeric). The viewer identifier indicates the user identification of the user who views the suggestion.

The time stamp field includes a date (e.g., year, month, and day), time (e.g., hour, minute, and second), or both. The time stamp indicates the date and time that a user viewed the suggestion.

An entry 575 in suggestions history table 520 includes suggestion identifier 536, a viewer identifier 578, and a time stamp 581. In a specific implementation, an entry is made in the suggestions history table each time a unique user views or clicks on the suggestion. Furthermore, in this specific implementation, the time stamp is updated each time the unique user views the suggestion.

In a specific implementation suggestions history table 520 can be cross-referenced with suggestions table 516 to track which user viewed the suggestion and the time that the user viewed the suggestion.

Figure 6:
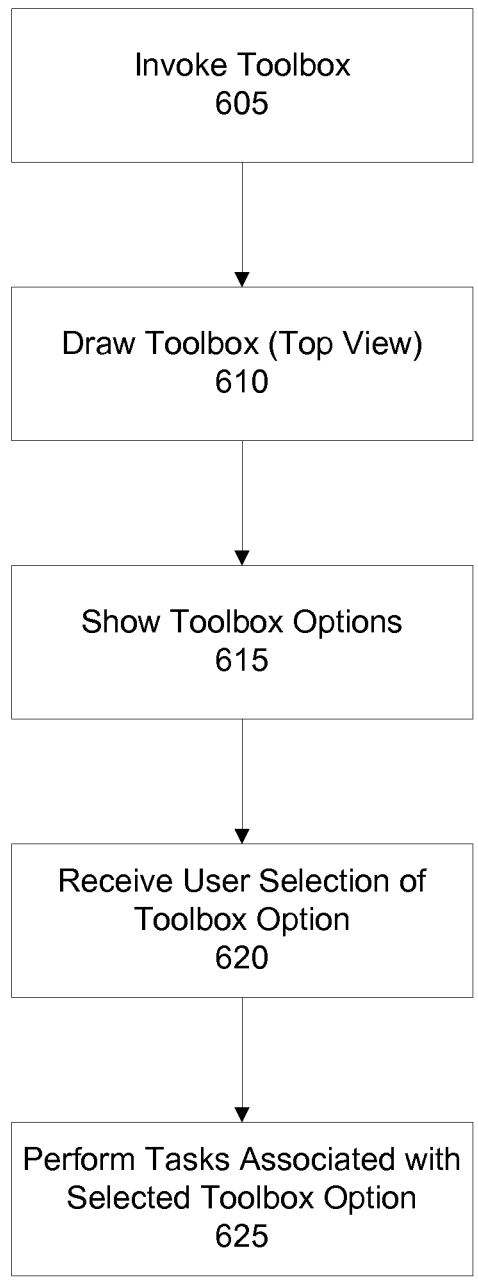
FIG. 6 shows a flow diagram for accessing the options from a toolbox program of the invention.

FIG. 6 shows a flow diagram for accessing the options from a toolbox of the invention. In a step 605, a toolbox is invoked. In a specific implementation, the toolbox is invoked after the user selects a portion of the content. FIG. 7 shows an example of a selected content 705 from a user created content 710. The user created content is displayed as part of a Web page within a window of a browser application program 711.

In this specific implementation, the user selects the portion of the content from a paragraph using a mouse. Specifically, the user clicks the left mouse button at a start position 715 of the portion. The user holds down the left mouse button and drags the cursor over the portion. The system responds by highlighting the portion as the user drags the cursor. The user then releases the left mouse button at an end position 720 of the portion. The system detects the release of the button and invokes a toolbox 725.

In this specific implementation, the system gathers and stores the paragraph identifier and the start and end positions of the selected content. The paragraph identifier and start and end positions are transmitted from the client to the server.

Tables D-K below show examples of code for selecting the portion of the content, identifying the paragraph that the content is associated with, and identifying the position or location of the selected content within the paragraph.

Table D below shows an example of code for the Internet Explorer browser program for selecting and highlighting a portion of the content.

TABLE D this.selection.createRange( ).pasteHTML("<span id="range-temp"></span>s");

Table E below shows an example of code for the Firefox browser program for selecting and highlighting a portion of the content.

TABLE E myParent.insertBefore(mySpan, myNodes[i][0]); //Firefox has bugs if we don't attach the span first; we can't just append it because we don't know where it goes in the parent
   Spans.push(mySpan);

Table F below shows an example of code for the Internet Explorer browser program for capturing the selected text where the selected text includes plain text.

TABLE F document.selection.myRange.text;

Table G below shows an example of code for the Internet Explorer browser program for capturing the selected text where the selected text includes HTML tags.

TABLE G document.selection.myRange.htmlText;

Table H below shows an example of code for the Firefox browser program for capturing the selected text.

TABLE H window.getSelection( );

Table I below shows an example of code for the Internet Explorer browser program for obtaining the paragraph identifier.

TABLE I document.selection. selection.createRange( ).parentElement( ).id;

Table J below shows an example of code for the Firefox browser program for obtaining the paragraph identifier.

TABLE J window.getSelection( ).selection.focusNode.parentNode.id;

Table K below shows an example of code for calculating the start and end positions of the selected text.

TABLE K

```
// This is the main part of code to calculate the start count selected text.
var startCount = new Array( );
    var rid__count = 0;
    var start = 0;
    startCount = TextArray[0].split(" ");
    if ( ectoolbox__msieversion( ) >= 4 ) {
        var start = 0;
        var rid__array = Array( );
        rid__array = TextArray[0].split("jquery");
        rid__count = rid__array.length;
        start = startCount.length;
    } Else {
        start = 0;
        for(i = 0;i < startCount.length; i++) {
            start = start + 1;
        }
    }
    if(rid__count > 1 && start != 1)
        start = start - (rid__count - 1);
    //This is the main part of code to calculate the end count selected
    text.
    var endCount = new Array( );
    var selected__text = str;
    var amp__array = Array( );
    amp__array = selected__text.split(" ");
    selected__text = selected__text.replace(/ /gi," ");
    selected__text = selected__text.replace(/\r/gi,"");
    endCount = selected__text.split(" ");
    var amp__length = 0;
    if(amp__array.length > 0)
        amp__length = amp__array.length - 1;
    else
        amp__length = 0;
    var total__word__count = 0;
    for(i = 0;i < endCount.length;i++) {
        total__word__count = total__word__count + 1;
    }
    total__word__count = total__word__count + parseInt(amp__length);
    if(total__word__count ==1)
        var total__count = 1;
    else
    var total__count = total__word__count;
    var end = 0;
    if ( ectoolbox__msieversion( ) >= 4 ) {
        end = total__count + (start - 1);
    } else {
        if(yes__tag == 0)       {
            end = total__count + (start - 1);
        } else {
            if(firefox__trim==0) {
                end = total__count + start;
            } else if(firefox__trim>0) {
                end = total__count + start+firefox__trim;
            }
        }
}}
```

In a step 610 (FIG. 6), the system draws a top view of the toolbox. The toolbox can be drawn at any position or location on the Web page or document. Typically, the toolbox is drawn such that it does not overlap the selected content. The toolbox may overlap the nonselected content. In a specific implementation, the toolbox is drawn so that it is positioned at or near the selected content. In this specific implementation, the toolbox is drawn such that an upper left-hand corner of the toolbox is positioned at or near the end position of the selected content.

Generally, the toolbox is displayed in a floating window which is superimposed over the Web page, i.e., the toolbox overlays the Web page or appears on top of the Web page. The user can reposition the toolbox to any other position within the Web page. For example, the user, using the left mouse button, can select a title bar of the toolbox, drag the toolbox to a new position, and then release the left mouse button. In another implementation, the toolbox is displayed in a non-floating window. That is the toolbox is in a fixed position on the Web page and the user is not able to move the toolbox to a different position.

In a step 615 (FIG. 6), the system shows the toolbox options in the toolbox. As shown in FIG. 7, in this specific implementation, the toolbox includes five options including a make suggestion option 730a, a translate it option 730b, a hear it option 730c, a copy option 730d, and a quote option 730e. The toolbox includes a user-clickable object 735 (e.g., icon, link, or button) that when clicked or selected closes the toolbox and exits the toolbox program.

In a specific implementation, the system determines which toolbox options a user is authorized to perform and shows those options. Toolbox options that the user is not authorized to perform are not shown. For example, the system may allow only registered uses to make suggestions. If the user is a registered user the make suggestion option will be shown in the toolbox. If the user is not a registered user the make suggestion option will not be shown in the toolbox.

Various features of the toolbox are also described in U.S. patent application Ser. No. 12/390,450, filed Feb. 21, 2009, which is incorporated by reference along with all other references cited in this application.

In a step 620 (FIG. 6), the system receives a user selected toolbox option. In a step 625, the system performs tasks associated with the selected toolbox option. In a specific implementation, one or more of the flow steps shown in FIG. 6 is performed using executable code. This code can be executable source code, interpreted code, or compiled code (e.g., binary or machine code). This code can be executed by a browser or other execution mechanism (e.g., interpreter, compiler, plug-in, or browser plug-in) available on client device where the toolbox is invoked. The code is executed by the processor of the client device.

The toolbox tool may be implemented using cloud computing, where users access the tool through the cloud. The toolbox can be updated in the cloud, and delivered to users through, for example, their web browsers, so users do not need to manually update toolbox software on their system. The code may be embedded with the content (e.g., document or Web page) that is transmitted from the server to the client. For example, the code can be embedded in the Web page document. Whenever a user pulls up a Web page, the executable code is delivered to that user. In other implementations, the code may be sent or downloaded separately from the Web page. For example, code can be downloaded as a plug-in that resides on the user's device, and the Web page invokes this plug-in.

Further, in a specific implementation, the code is written or uses AJAX (Asynchronous Java Script plus XML). One of skill in the art will recognize that other techniques to create interactive Web applications may instead or additionally be used. For example, some other languages and protocols include Microsoft ActiveX, XML, PHP, Adobe Flash, Flex, Microsoft Silverlight, Java applets, JavaFX, Jscript, ASP, JavaServerFaces, Objective C, cascading style sheets (CSS), HTML5, H.264/AVC, Visual Basic for application, VBScript, Microsoft .NET, Lisp, Perl, Python, and others.

In a further implementation, the code for the toolbox resides at and is executed at server. The user will interact with the server in user the server. In such an implementation, as more users use the toolbox, the server handles serving the toolbox to these multiple users. Compared to the above implementation where the code executes on the client, executing code on the client does not require as much resources of the server; generally, such an implementation allows the system to scale to larger numbers of users more easily.

Although we give some examples where there are two or three users in this patent application. This is merely for illustration, because a system of the invention can handle many numbers of users such as from a few (such as 4, 5, 6, 7-16, 30) to many numbers (such as 5000, 10,000, 40,000, 1 million, 5 million, or more) at the same time. A system of the invention allows these many users to use the toolbox to interact with each other.

In a specific implementation, the executable code running on the client device detects and the inputs of the user at the client device. For example, the user may indicate that the user wants to input some suggested text at a particular position in a Web page (this same Web page may include the executable code for the toolbox). The toolbox will then draw a window on a screen of the client device seeking a suggestion input from the user.

The user types in the user's suggestion and indicates completion by hitting enter or hitting an appropriately labeled button (e.g., accept or finished) in the toolbox window. The user accepts the user's input and stores this input. The toolbox can store this input temporarily at the client device, such as for caching purposes, but the input will be transmitted to the server, where it is stored for later viewing by others (e.g., another user at a different client device) who pull up the Web page.

FIG. 8 shows a flow diagram for making suggestions to user created content such as a body of text in a blog. An arrow 805 indicates the user selected the make a suggestion option 730a (FIG. 7).

In a step 810 the system displays a suggestion view of the toolbox. The suggestion view includes the selected content from the Web page, and suggestion and explanation input boxes.

FIG. 9 shows an example of a suggestion view 905 of the toolbox. The suggestion view includes selected content 705 (FIG. 7) displayed in a selected content box 909, a Web page author (or author of the content box) 910, a suggestion input box 915, an explanation input box 920, and a submit button 925.

The selected content when displayed in selected content box 909 can be displayed using any color to help call attention to the selected content. In a specific implementation, the selected content is displayed in red, but can be displayed in any color such as blue, yellow, green, orange, black, pink, and purple.

As shown in FIG. 9 a layout of the suggestion view includes the Web page author in an upper left-hand corner of the layout and the selected content in an upper right-hand corner of the layout. The suggestion input box is below the Web page author and the selected content. The explanation input box is below the suggestion input box. The submit button is below the explanation input box. In other words, the suggestion and explanation input boxes are between the Web page content author or the selected content and the submit button. The explanation input box is between the suggestion input box and the submit button.

However, it should be appreciated that FIG. 9 shows but one example of the layout or arrangement of the components (i.e., Web page content author, selected content, suggestion input box, explanation input box, and submit button). The components can be arranged in any order or position. For example, the arrangement of the Web page content author and the selected content may be swapped. The selected content may be displayed in the upper left-hand corner of the toolbox. The Web page content author may be displayed in the upper right-hand corner of the toolbox, and so forth.

In a specific implementation, the selected content is also displayed in the suggestion input box. That is, the suggestion input box defaults or is prepopulated with the selected content. The user can make the suggestion by editing or changing specific portions of the selected content without having to retype other portions of the selected content that the user wishes to keep. In another implementation, the suggestion input box is blank or empty.

Generally, the suggestion input box requires input and the explanation input box is optional. After the user clicks the submit button, the system checks whether or not the suggestion input box includes a suggestion. This check may be done at the client, at the server, or both. If there is no suggestion the system prompts the user via a dialog box to input a suggestion.

Referring now to FIG. 8, in a step 815 the system accepts the input from the suggestion and explanation input boxes.

In a step 820 the system associates the suggestion with the paragraph (i.e., paragraph identifier) that the selected content is in and the position of the selected content within the paragraph.

In a step 825 the system stores the suggestion, explanation, paragraph identifier, and position of the selected content in the suggestions database. The system makes an entry in the suggestions database that includes the suggestion identifier, suggestion, explanation, paragraph identifier, and position. See FIG. 5. The entry may further include assigning a status to the suggestion (e.g., assigning a new status).

In a step 830 the system updates the suggestions identification database. The system makes an entry in the suggestions identification database that includes the suggestion identifier, the suggester identifier, and the node identifier. See FIG. 5.

In a specific implementation, a link to view suggestions is displayed on the Web page when the user created content includes one or more suggestions.

In a specific implementation, the suggester can edit the suggestion after the suggestion is submitted. For example, the suggester may edit the suggestion before it is approved or rejected. Generally, the user or suggester is not allowed to delete a suggestion after it has been made. However, in other implementations a user can delete a suggestion after it has been made.

Figure 10:
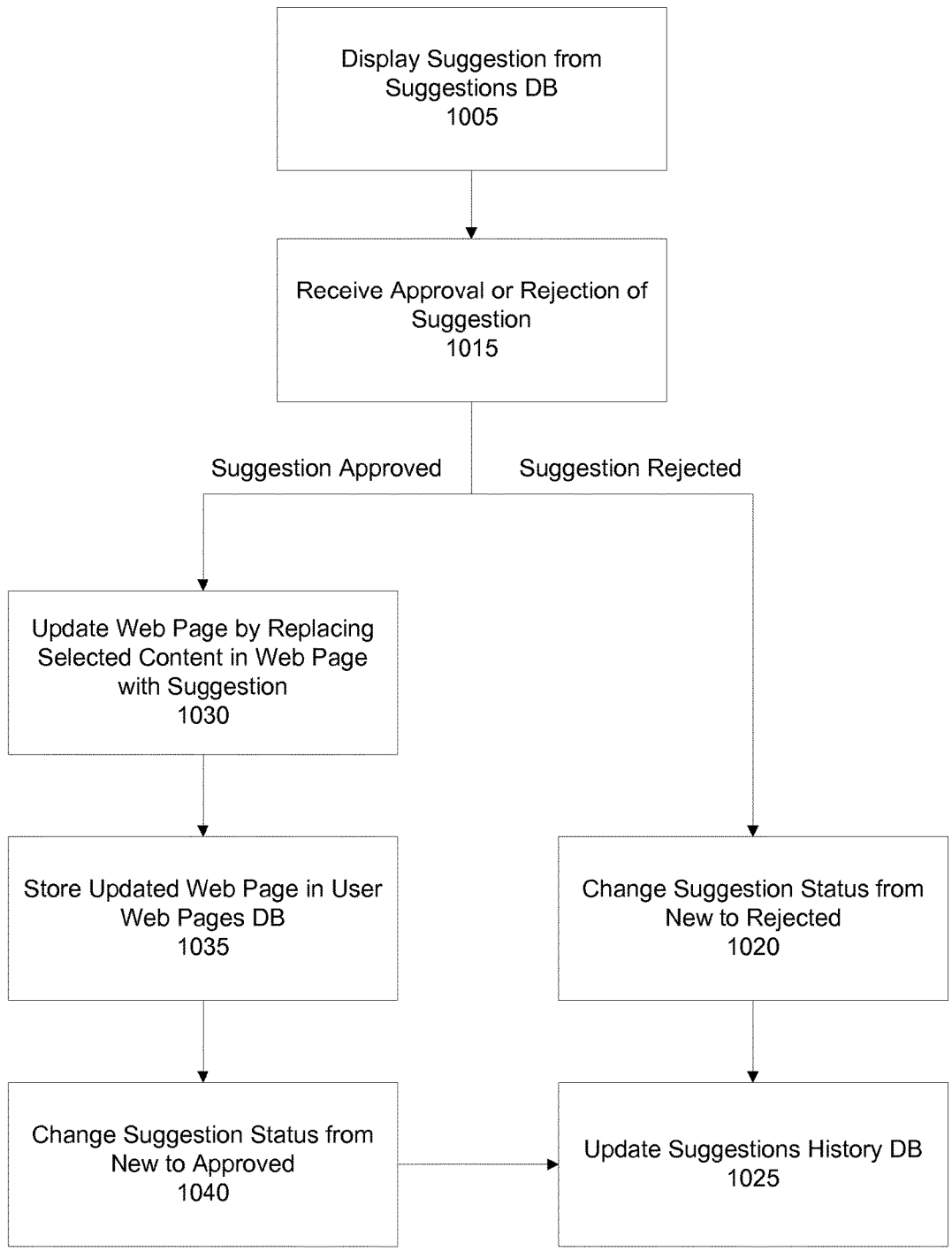
FIG. 10 shows a flow diagram for approving and rejecting suggestions.

FIG. 10 shows a flow diagram for approving and rejecting suggestions. In a step 1005 one or more suggestions from the suggestions database is displayed on a Web page.

In a step 1015 the system receives an approval or a rejection of the suggestion. In a step 1020, if the system receives a rejection of the suggestion, the system changes the suggestion status from new to rejected. In a step 1025 the system updates the suggestions history database. See FIG. 5.

In a step 1030, if the system receives an approval of the suggestion, the system updates the Web page by replacing the selected content in the Web page with the suggestion. In a specific implementation, the body column (see table B) is updated with the suggested text. In this specific implementation, the timestamp column (see table B) is likewise updated to indicate the date and time of the update.

In a step 1035 the updated Web page is stored in the user Web pages database. The browser window or Web page in the browser is refreshed to show the new Web page with the selected content now replaced with the suggestion.

with the suggestion, prompts the user for confirmation (e.g., displays a dialog box requesting confirmation). If the user confirms the acceptance, the selected content is replaced with the suggestion. If the user does not confirm the acceptance, the selected content is not replaced with the suggestion.

TABLE L

```
for($i = 0; $i < count($OrgArray); $i++) {
$block = ectoolbox_block_text($OrgArray[$i]);// here we block the Tags like Object,
Param, embed, table etc.,
if($block > 1)
$flag = 1;
if($flag == 0) {
if(trim($OrgArray[$i]) != "") {
    if($Sugg_Parent_ID == $para) {
    $WordArray = explode(" ",$OrgArray[$i]);
    $sugg_orginal = explode(" ",$Sugg_Org_Cont);
    $intersect = array_intersect($WordArray,$sugg_orginal);
    $word_count = 1;
    $flag = 0;
    if(count($intersect) > 0 && isset($intersect) && !empty($intersect)) {
    for($j = 0; $j < count($WordArray); $j++) {
    if($flag == 1){
    $WordArray[$j] = "!@#$%^&*(Temp_Variable_)(*&^%$#@!";//Here replace the
rest of the text with temp text
    }
    if($flag == 2) {
    break;
    }
    if($word_count == $Sugg_Content1[0]["start_position_count"]) {
    $WordArray[$j] = $Suggestion; // here push the suggested text to the first word of
the original text
$flag = 1;
    }
    if($word_count == $Sugg_Content1[0]["end_position_count"]) {
    $flag = 2;
    }
$word_count = $word_count + 1;
    }
$OrgArray[$i] = implode(" ",$WordArray);
}
$new_word_array = array( );
    $wc = 0;
for($j = 0; $j < count($WordArray); $j++) {
if($WordArray[$j] != "!@#$%^&*(Temp_Variable_)(*&^%$#@!") {
$new_word_array[$wc] = $WordArray[$j]; // here remove the temp text
    $wc = $wc + 1;
    }
    }
    }
$OrgArray[$i] = implode(" ",$new_word_array);
    }
    $para = $para + 1;
    }
$un_block = ectoolbox_un_block_text($OrgArray[$i]); // here we unblock the Tags like
Object, Param, embed, table etc.,
if($un_block > 1)
    $flag = 0;
    }
$ReplacedText = implode("\n",$OrgArray);//implode all array values and store into a single
variable
```

In a step 1040, the system changes the suggestion status from new to approved. In step 1025, the suggestions history database is updated.

Table L below shows an example of code for replacing the selected content with the suggestion. This example of code is written in a scripting language that may be referred to as Personal Home Page (PHP). In a specific implementation, the selected content includes text from a blog. The code is executed when the user confirms their desire to replace the selected content with the suggestion (e.g., user clicks a "yes, I'm sure" button). In other words, in a specific implementation, the system after receiving an indication of acceptance of a suggestion and before replacing the selected content In a specific implementation, a suggestion status is one of five status types including new, approved, discarded, agreed to, and agree pending. The new status type is assigned to a newly submitted suggestion. A suggestion with a new status type has not been approved or discarded. In this specific implementation, suggestions that are new are displayed with an asterisk (e.g., orange asterisk) on certain Web pages such as the suggestions summary page. This helps to focus the user's attention on new or recent suggestions.

In a specific implementation, a suggestions summary page includes a first tab page and a second tab page. The first tab page includes a list of suggestions given, identifies or displays the user who received the suggestion, identifies the title of the document or blog post to which the suggestion was made, identifies the date, time, or both of when the suggestion receiver viewed the suggestion, the status of the suggestion (e.g., discarded, approval pending, accepted, rejected, agreed, not agreed, conditionally accepted, conditionally rejected, and so forth), a number of suggestions given, a number of suggestions approved, and an approval rate.

The second tab page includes a list of suggestions received and may include information that is similar to the first tab page. For example, the second tab page with the list of suggestions received may identify or display the user who made the suggestion, the title of the document or blog post to which the suggestion was made, the date and time of when the suggestion was viewed, the status of the suggestion, a number of suggestions received, a number of suggestions approved, and an approval rate. The suggestions summary page can be filtered, sorted, and searched. Suggestions may be filtered using any of the database fields (e.g., see table A) discussed in this application. Suggestions may be filtered based on user (or suggester), suggestion status, time of suggestion, date of suggestion, and so forth. Sorting suggestions include sorting suggestions chronologically, reverse chronologically, and alphabetically. Sorting may be on multiple levels on multiple fields (e.g., sort on user first, then sort by date).

For example, the content owner may wish to see suggestions from a particular user and ignore or hide suggestions from other users. Suggestions may be filtered by user (or suggester), date suggestion was made, time the suggestion was made, length of a suggestion, whether or not the suggestion includes an explanation, language fluency of the suggester, suggester's native country, suggester's rating information, one or more key words in a suggestion, explanation or both, suggestion status, or combinations of these—just to name a few examples.

The content owner may filter the suggestions to see suggestions from a particular user, or users who have a certain rating or experience level, or members of a particular group (e.g., teachers or instructors, board members, managers, students, a particular distribution list, or peers), while those users that are not part of that group will not be shown in the summary screen.

The content owner may filter and view in the summary only suggestions with respect to one paragraph of a page, while ignoring other suggestions on the page. The content owner may filter and view in the summary only suggestions after a particular date, while ignoring other suggestions made before that date. The content owner may filter and view in the summary only suggestions before a particular date, while ignoring other suggestions made after that date. The content owner may filter and view in the summary only suggestions after a time on a particular date, while ignoring other suggestions made before that time and date. The content owner may filter and view in the summary only suggestions before a particular time on a date, while ignoring other suggestions made after that time and date.

In a specific implementation, the system or a toolbox includes a search tool to allow the user to search the suggestions. Search options include searching based on key words, searches based on exclusions, searches based on exact phrases, searches based on any word in a phrase, searches covering a specific paragraph, a specific grouping of paragraphs, documents, or both, and so forth.

The approved status type is assigned to the suggestion when the author of the content approves the suggestion. The discarded status type is assigned when the author of the content rejects or discards the suggestion.

In this specific implementation the status types agreed to and agree pending are used in cases where there are two or more suggestions for the same selected content. For example, a first user may have made a first suggestion to a selected content. A second user may have made a second suggestion to the selected content. Initially, the status type for the first and second suggestions is new. The content author can then review the first and second suggestions and decide, for example, which suggestion to approve. When the content author approves one of the suggestions the status of the other suggestion changes from new to agree pending.

For example, if the content author approves the first suggestion the first suggestion changes from new to approved. The second suggestion changes from new to agree pending. If the content author agrees with the second suggestion the status changes from agree pending to agree to. If the content author disagrees with the second suggestion the status changes from agree pending to discarded.

In this specific implementation, the system will not replace the selected content (now having been replaced by the first suggestion) with the second suggestion when the second suggestion is agreed to. Instead, the status agree to is used to indicate, for example, that while the content author generally agreed with the second suggestion, the content author preferred the first suggestion. In another implementation, agreeing to the second suggestion replaces the selected content (or first suggestion). For example, the content author, after approving the first suggestion, may later prefer instead the second suggestion. The content author can then accept the second suggestion and the system will replace the selected content (or first suggestion) with the second suggestion.

In a specific implementation, a user is able to undo a suggestion. For example, after a suggestion has been approved and the suggestion has replaced a portion of the user created content, the user can undo a suggestion to arrive or revert back at the original content.

Figure 11:
FIG. 11 shows an example of a Web page having suggestions to user provided content.

FIG. 11 shows an example of a Web page 1105 displayed within a browser 1110. The Web page includes user created content 1115. In this example, the user created content includes one or more suggestions. In a specific implementation, if there are current suggestions (e.g., new or suggestions that have not been approved or rejected) a current suggestions link 1120 is displayed on the Web page adjacent to the user created content. If there are no current suggestions link 1120 is not displayed.

In this specific implementation, if there are old suggestions (e.g., suggestions that have been approved or rejected) a suggestions history link 1125 is displayed on the Web page adjacent to the user created content. If there are no old suggestions link 1125 is not displayed.

Figure 12:
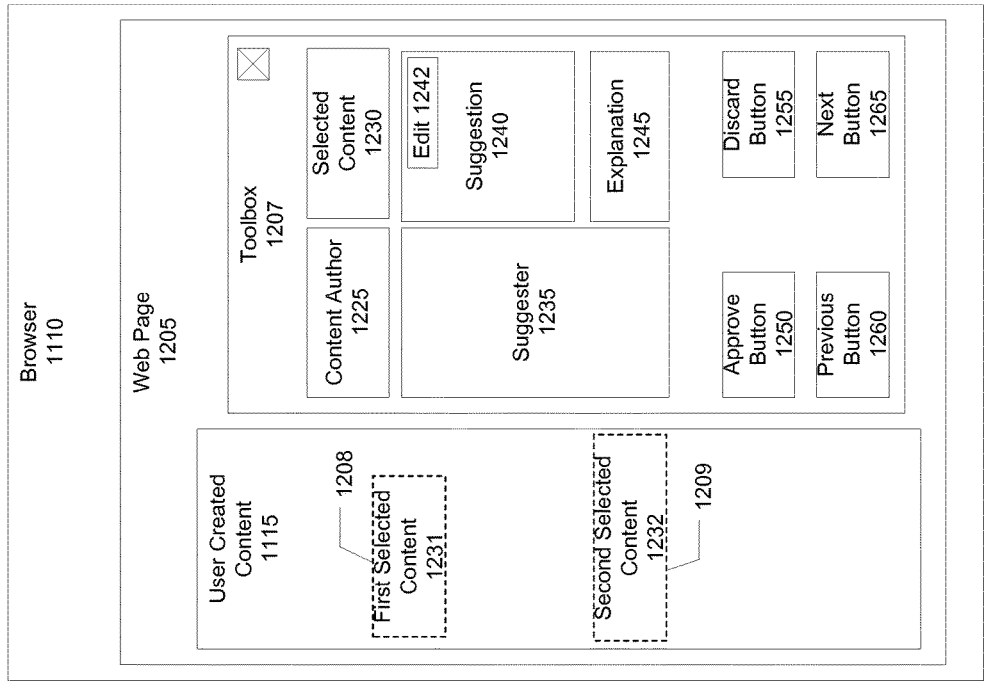
FIG. 12 shows an example of a review view of the toolbox to approve or reject suggestions.

FIG. 12 shows an example of a Web page 1205 to view and approve or reject (e.g., discard) suggestions when the user clicks suggestions link 1120 (FIG. 11). A review view of a toolbox 1207 is invoked and drawn on the page. First and second highlights 1208 and 1209 highlight selected portions of the user created content for which there are suggestions. In this example, two suggestions have been made. A first suggestion has been made to a first selected content 1231. The first selected content is highlighted by the first highlight. A second suggestion has been made to a second selected content 1232. The second selected content is highlighted by the second highlight.

Table M below shows an example of code for highlighting portions of the user created content for which there are suggestions.

TABLE M

```
for(i=0;i<sid_array.length;i++) {
var parent_num = pid_array[i];
    var id_s = "Sub_Id_"+sid_array[i]+"_Ec_Tool_Box";
    var starting_point =
parseInt(each_count_start[parent_num])+parseInt(start_position[i])-2;
    var ending_point =
parseInt(each_count_start[parent_num])+parseInt(end_position[i])-2;
    if(parseInt(start_position[i])== 1) {
        var para_first = new Array( );
        para_first = whole_content[starting_point].split(">");
        para_first[1] = "<span class='Sugg_Content_dotted' id='"+id_s+"'
onclick='Show_Suggession(\"\",\"\",\"\",\"'"+sid_array[i]+"'\",\"\");'>"+para_first[1];
        var first_content = para_first.join(">");
        whole_content[starting_point] = first_content;
    } else {
whole_content[starting_point] = "<span class='Sugg_Content_dotted' id='"+id_s+"'
onclick='Show_Suggession(\"\",\"\",\"\",\"'"+sid_array[i]+"'\",\"\");'>"+whole_content[starting_
point]
    }
    if((each_count_end[parent_num] - 2) == ending_point)       {
        para_last       = whole_content[ending_point].split("</");
        para_last[para_last.length-2] = para_last[para_last.length-2]+"</span><span
id='pos_"+sid_array[i]+"' style='visibility:hidden'> </span>";
        last_content = para_last.join("</");
        whole_content[ending_point] = last_content;
    } else {
        whole_content[ending_point] =
whole_content[ending_point]+"</span><span id='pos_"+sid_array[i]+"'
style='visibility:hidden'> </span>";
    }
    }
```

In a specific implementation, the toolbox is drawn in a floating window and can be repositioned by the user. In another implementation, the toolbox is drawn in a fixed or non-floating window.

This toolbox includes a content author box 1225, a selected content box 1230, a suggester box 1235, a suggestion box 1240 with an edit suggestion link 1242, an explanation box 1245, an approve button 1250, a discard button 1255, a previous button 1260, and a next button 1265. As explained, in a specific implementation, a user can submit a suggestion without having to input an explanation for the suggestion. If this is the case explanation box 1245 is not be displayed since there is no explanation to display.

In a specific implementation, the toolbox has a layout as shown in the example of FIG. 12. A first or top row of the layout includes the content author box and the selected content box. A second row includes the suggestion box. A third row includes the explanation box for the suggestion, if any. The suggester box spans across the second and third rows. A fourth row includes the approve and discard buttons. A fifth row includes the previous and next buttons.

However, it should be appreciated that FIG. 12 shows but one example of the layout or arrangement of the components. The components can be arranged in any order or position.

The content author is the user who authored the user created content. In a specific implementation, the toolbox shows one suggestion and the associated selected content and explanation at a time. Thus, in this example, the selected content box displays either first selected content 1231 or second selected content 1232. Similarly, the suggestion box displays either the first suggestion or the second suggestion. The next and previous buttons allow the user to scroll though the various suggestions that might have been made to various portions of the user created content. However, it should be appreciated that the toolbox may display any number of suggestions and selected content.

Typically, the order in which the suggestions are traversed using the toolbox is with respect to the position or location of the suggestions within the user created content. In a specific implementation, the order is left to right and top to bottom within the user created content. As an example, a location of first selected content 1231 is above a location of second selected content 1232 within user created content 1115. Thus, selected content box 1230 will display the first selected content and suggestion box 1240 will display the first suggestion, i.e., the suggestion associated with the first selected content.

In various other implementations, the order in which the suggestions are traversed is right to left and bottom to top with respect to the position or location of the suggestions within the user created content. The suggestions are ordered according to the time they were made (e.g., chronologically or reverse chronologically).

In a specific implementation, a highlighting style of the highlights is based on which suggestion is currently displayed in the toolbox. This allows the user to quickly associate the suggestion displayed in the toolbox with the specific piece of selected content within the user created content. When displaying the first suggestion in selected content box 1230 first highlight 1208 is displayed using a first highlighting style. Second highlight 1209 is displayed using a second highlighting style, different from the first highlighting style.

In this specific implementation, the first highlighting style includes a solid underline. The second highlighting style includes a dotted or dashed underline. It should be appreciated that any highlighting style or any mark or visual indicator may be used. Some examples of other highlighting styles or techniques include colors, boxes, clouds, bubbles, shading, icons, animation, different font types, different font sizes, and combinations of these (e.g., solid red underline or dashed red underline).

When the user clicks the next button to advance to the second suggestion the highlighting style of first highlight 1208 changes from the first highlighting style to the second highlighting style. The highlighting style of second highlight 1209 changes from the second highlighting style to the first highlighting style.

The content author, after reviewing the suggestion and explanation, if any, can approve the suggestion by clicking the approve button or reject the suggestion by clicking the discard button.

Edit suggestion link 1242 allows the content author to edit the suggestion before approving or discarding the suggestion. For example, the content author, after reviewing the suggestion, may generally agree with the suggestion, but may want to make some changes to the suggestion. The content author can click the edit suggestion link to be presented with an editable version of the suggestion. The content author can then edit the suggestion. When the content author clicks the approve button, the edited suggestion replaces the selected content.

In a specific implementation, the system or a toolbox includes one or more filters to allow a user to filter suggestions. For example, a user A may wish to see suggestions from a particular user and hide suggestions from other users. The particular user may be, for example, someone that user A particularly trusts to offer good suggestions. Any of the database fields discussed in this application, including combinations of database fields, may be used to filter suggestions.

Suggestions may be filtered by user (or suggester), date suggestion was made, time the suggestion was made, length of a suggestion, whether or not the suggestion includes an explanation, language fluency of the suggester, suggester's native country, suggester's rating information, one or more key words in a suggestion, explanation or both (e.g., show me suggestions that have the word "lobster" in them), suggestion status, or combinations of these—just to name a few examples.

User A may filter the suggestions to see suggestions from users who have a certain rating or experience level. For example, user A may filter the suggestions to see suggestions from users who have made a certain number of suggestions (e.g., show me suggestions from users who have made 50 or more suggestions), user A may filter the suggestions to see suggestions from users who have a certain approval or acceptance rating (e.g., show me suggestions from users who have had at least 80 percent of their suggestions accepted, show me suggestions from users whose suggestions I have previously accepted), user A may filter the suggestions to see suggestions from their network of friends (e.g., show me suggestions from users who are in my friends group, show me suggestions from users who are in my family group), user A may filter suggestions to see suggestions from suggesters who have a particular language fluency (e.g., show me suggestions from users who are experts in Japanese, show me suggestions from users who are fluent in Spanish), and so forth.

These filters can help user A to sort through suggestions, especially when the document includes dozens, hundreds, or thousands of suggestions.

In a specific implementation, the system or a toolbox includes a search tool to allow the user to search the suggestions. Search options include searching based on key words, searches based on exclusions (e.g., search suggestions having the word "rock" but not the word "olive"), searches based on exact phrases, searches based on any word in a phrase, searches covering a specific paragraph, a specific grouping of paragraphs, documents, or both, and so forth.

Referring now to FIG. 7, toolbox 725 may instead or additionally include any of the other options besides make a suggestion 730*a* for the user to select. For example, the user after selecting content 705 may translate the selected content by clicking the translate it option.

In a specific implementation, the "translate it" feature is initiated when the EnglishCafe user wants to read the text of the blog translated into some other language. It may be done by selecting the text for which the user wants to translate and selecting the translate it option from the toolbox. In another implementation, the user can enter a suggestion in one particular language (e.g., Spanish) and have it translated into another language (e.g., English). Other translations maybe Chinese to English, English to Chinese, English to German, German to English, English to Spanish, and Spanish to English, Spanish to Hindi, and Hindi to English, and others. The user can view the translated suggestion and make edits to the selected translation before indicating or electing to enter and save the suggestion.

In a specific implementation, the user who would like to read a text in the desired language can be an EnglishCafe user, authenticated user or an anonymous user. An example of the flow of the translate it feature is as follows.

1. The user visits a blog post.
2. The user wants to translate a part of text of the blog post to some other language for reading.
3. The user selects the part of text to be translated, when a pop-up window of toolbox opens up.
4. By selecting the "translate it" option, another window opens up.
5. The selected text from the blog will be highlighted in red in the "selected text" textbox. Beneath that are the "translate selected text" label and the "English to" dropdown box which lists all the pre-defined languages.
6. The user selects a language from the dropdown. The translated text from English to the selected language is shown beneath the dropdown box with the label "translated text."

Table N below shows an example of code for translating the selected content.

TABLE N

```
$url =
'http://releasecorp.globalenglish.com/englishcafe/ecapi.asp?mode=trans&language='.$lang.
'&word='.$str."&ecid=".$user_id."&key=".$encrypt_key;
    // here we are using CURL to fetch the data from another server using URL.
$ch = curl_init( );
    curl_setopt($ch, CURLOPT_HEADER, 0);
    curl_setopt ($ch, CURLOPT_REFERER, $url);
    curl_setopt($ch, CURLOPT_URL, $url);
    curl_setopt($ch, CURLOPT_POST, 1);
```

TABLE N-continued

```
    curl_setopt($ch, CURLOPT_RETURNTRANSFER, 1);
    curl_setopt($ch, CURLOPT_FOLLOWLOCATION, true);
    $data = curl_exec($ch);
The above code will give the XML Output only. From our end we will parse that XML.
This is the main part of server side code (PHP) to Parse XML.
$this->resParser = xml_parser_create ( );
xml_set_object($this->resParser,$this);
xml_set_element_handler($this->resParser, "tagOpen", "tagClosed");
xml_set_character_data_handler($this->resParser, "tagData");
$this->strXmlData = xml_parse($this->resParser,$strInputXML );
if(!$this->strXmlData) { die(sprintf("Sorry, There is a problem with our Translation"));
//die(sprintf("XML error: %s at line %d",
xml_error_string(xml_get_error_code($this->resParser)),
xml_get_current_line_number($this->resParser))); }
xml_parser_free($this->resParser);
```

Aspects of a translation feature are also described in U.S. Pat. No. 7,389,221, issued Jun. 17, 2008, which is incorporated by reference along with all other references cited in this application.

The user after selecting content 705 may hear a vocalization of the selected content by clicking the hear it option.

In a specific implementation, the "hear it" feature is initiated when the EC user wants to hear the text of the blog. It may be done by selecting the text for which the user wants to hear and select the hear it option from the toolbox. In a specific implementation, the user who would like to hear a text can be an EnglishCafe user, authenticated user, or an anonymous user. Audio drive should be installed. A flow example of the hear it feature is as follows.

1. The user visits a blog post.
2. The user wants hear a part of text of the blog.
3. The user selects a part of text of the blog when a pop-up window of toolbox opens up.
4. By selecting the option "hear it," another window opens up.
5. The selected text from the blog will be highlighted in red in the "selected text" textbox. Beneath that are the "hear selected text" label, "choose voice" dropdown box which lists all the pre-defined voices and the "select speed" option buttons for normal or slow speed.
6. The user selects a desired voice from the dropdown, selects the speed and clicks the play button.
7. The user hears the desired text in the desired voice.

Table O below shows an example of code for obtaining an audio file (e.g., .wav file) of the selected content.

TABLE O

```
$wave_file =
"http://releasecorp.globalenglish.com/englishcafe/ecapi.asp?mode=tts&voice=".$voice."&s
peed=".$speed."&word=".$str."&ecid=".$user_id."&key=".$encrypt_key;
```

Table P below shows an example of code for the Internet Explorer browser for playing the file with an embedded tag.

TABLE P

```
<OBJECT id="mediaPlayer" width="318" height="45" classid="CLSID:22d6f312-b0f6-
11d0-94ab-0080c74c7e95"
codebase="http://activex.microsoft.com/activex/controls/mplayer/en/nsmp2inf.cab#Version=
5,1,52,701" standby="Loading Microsoft Windows Media Player components..."
type="application/x-oleobject"><param name="fileName" value="'+wave_file+'"><param
name="animationatStart" value="true"><param name="transparentatStart"
value="true"><param name="autoStart" value="false"><param name="showControls"
value="true"><param name="loop" value="false"><EMBED type="application/x-
mplayer2" pluginspage="http://microsoft.com/windows/mediaplayer/en/download/"
id="mediaPlayer" name="mediaPlayer" displaysize="4" autosize="-1" bgcolor="darkblue"
showcontrols="true" showtracker="-1" showdisplay="0" showstatusbar="0"
videoborder3d="-1" width="318" height="45" src="'+wave_file+'" autostart="false"
designtimesp="5311" loop="false"></EMBED></OBJECT>
```

Table Q below shows an example of code for the Firefox browser for playing the file with an embedded tag.

TABLE Q

```
<OBJECT id="mediaPlayer" width="318" height="45" type="application/x-ms-wmp"
codebase="http://activex.microsoft.com/activex/controls/mplayer/en/nsmp2inf.cab#Version=
5,1,52,701" standby="Loading Microsoft Windows Media Player components..."
type="application/x-oleobject"><param name="fileName" value="'+wave_file+'"><param
name="animationatStart" value="true"><param name="transparentatStart"
value="true"><param name="autoStart" value="false"><param name="showControls"
value="true"><param name="loop" value="false"><EMBED type="application/x-
```

TABLE Q-continued mplayer2" pluginspage="http://microsoft.com/windows/mediaplayer/en/download/" id="mediaPlayer" name="mediaPlayer" displaysize="4" autosize="-1" bgcolor="darkblue" showcontrols="true" showtracker="-1" showdisplay="0" showstatusbar="0" videoborder3d="-1" width="318" height="45" src="'+wave_file+'" autostart="false" designtimesp="5311" loop="false"></EMBED></OBJECT>

The user after selecting content 705 may copy the selected content to a clipboard by clicking the copy option.

In a specific implementation, the "copy it" feature is initiated when the EC user wants to copy a portion of the text of the blog. It may be done by selecting the text for which the user wants to copy and select the copy option from the toolbox. In a specific implementation, the user who would like to copy a text is an EnglishCafe user, authenticated user or an anonymous user. An example flow of the copy feature is as follows.

1. The user visits a blog post.
2. The user wants copy a part of text of the blog.
3. The user selects a part of text of the blog when a pop-up window of toolbox opens up.
4. By selecting the option "copy," the copied text from the blog is copied to the clipboard.
5. The user can use the copied text for his reference.

Table R below shows an example of code for the Internet Explorer browser for copying the selected content.

TABLE R window.clipboardData.setData( "Text", text );

Table S below shows an example of code for the Firefox browser for copying the selected content.

TABLE S $.clipboardReady(function( ) { $("#ectool_copy").click(function( ) { var txt = $("#displayid").html( ); $.clipboard(txt); return false; }); }, { swfpath: "<?=base_path( );?>"+"sites/all/modules/ectoolbox/jquery.clipboard.swf", debug: true }); }

The user after selecting content 705 may quote the selected content by clicking the quote option. In a specific implementation, the quoted selected content is used along with posting a comment to the user created content (e.g., commenting on a portion of a blog).

In a specific implementation, the "quote" feature is initiated when the EC user wants to comment a part of the text of the blog. It may be done by selecting the text for which the user wants to comment and select the quote option from the toolbox. In a specific implementation, the user who would like to comment for a portion of text is an EnglishCafe user or authenticated user. In this specific implementation, an anonymous user does not have permission to comment on a blog post. An example flow of the quote feature is as follows.

1. The user visits a blog post.
2. The user wants to comment on a portion of the blog post.
3. The user selects the portion to comment, when a pop-up window opens up.
4. The user selects the option "quote" from the toolbox.
5. "Insert comment" box is inserted below the blog post.
6. The text that has been selected to comment appears between the "[quote]," "[/quote]" phrases.
7. By default the cursor is placed beneath the "[/quote]."
8. The user gives the comment for the quoted text.
9. The comment can be in the form of text, photo, audio or video.
10. The user clicks the "post comment" button to post the comment.
11. The comment for the quoted text will be posted for the blog.

Table T below shows an example of JavaScript code for quoting the selected content.

TABLE T

```
$("#comment_form").html(comm_form);
    $("#comment_form").slideDown("medium",function sfocus( ){
        editor.initiate_ajax( );
        signature = $.trim($("#edit-comment").val( ));
        if(value!="" && typeof(value)!="undefined"){
            $("#edit-hidden-quote-comment").val(value);
            var newval = value+"\n\n\n\n"+signature;
            $("#edit-comment").val(newval);
            $("#quote_span").show( );
            document.getElementById("quote_img").title = "Hide Quote";
            setfocus('editcomment');
        }else{
            setfocus('newcomment');
        }
    });
    $(".grippie").remove( );
    $("textarea.editor-textarea").removeClass('processed');
    $('textarea.resizable:not(.processed)').TextAreaResizer( );
    $("textarea.editor-textarea").addClass('processed');
    $("textarea.editor-textarea").autogrow( );
```

TABLE T-continued

```
user_quote="";
str="";
$("#edit-update-comment").hide( );
$("#edit-reply-comment").hide( );
$("#quote_span").hide( );
if(document.getElementById("comment_form")){
    document.getElementById("comment_form").scrollIntoView(true);       }
```

Figure 13:
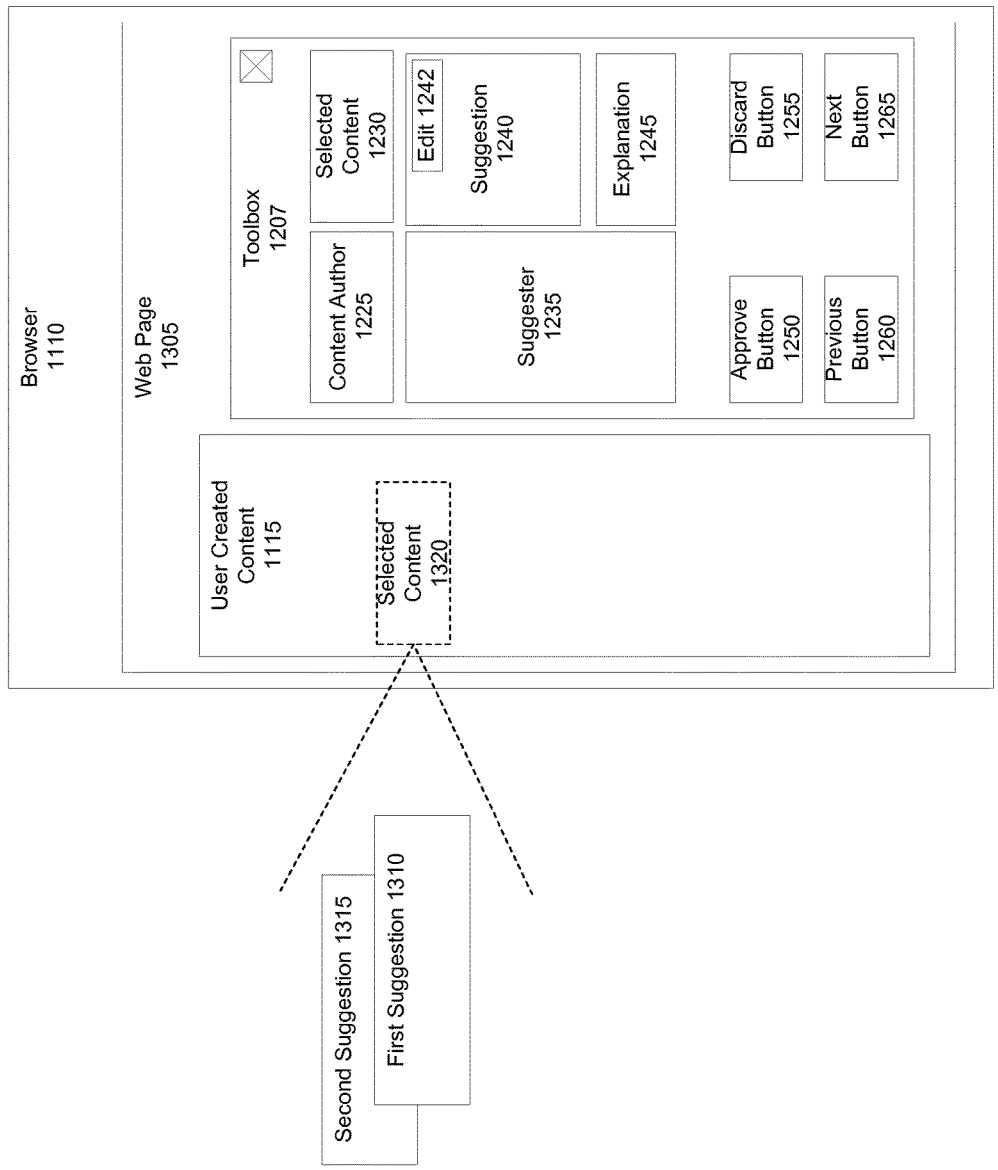
FIG. 13 shows an example of a Web page where two suggestions are associated with the same selected content.

FIG. 13 shows an example of a Web page 1305 where multiple suggestions (i.e., two or more suggestions) have been made to the same selected content. In this example, first and second suggestions 1310 and 1315, respectively, have been made to a selected content 1320. The system allows any number of suggestions to be made to a selected content. For example, there can be two, three, four, five, six, seven, eight, nine, ten, or more than ten suggestions made to the selected content.

Thus, in a specific implementation, the system allows suggester A to select a portion of content (i.e., selected content 1320) and make the first suggestion. The system allows suggester B to select the same portion of content (i.e., selected content 1320) and make the second suggestion. If the suggester so desires the suggester can provide an explanation of the suggestion.

A user can use the next and previous buttons of the toolbox to scroll through and view the first and second suggestions. For example, in this specific implementation, selected content 1320 is displayed in selected content box 1230 and the first suggestion is displayed in suggestion box 1240. The user can click the next button to view the second suggestion. That is, the toolbox then displays the second suggestion in suggestion box 1240. Selected content 1320 will continue to be displayed in selected content box 1230.

Thus, the user, such as the content author can view the different suggestions that have been made to the selected content. The content author can choose which suggestion (e.g., first or second suggestion) to approve. For example, the selected content may state:

"The motor vehicle propelled itself up the cliff and landed in nature's watery bosom."

Suggester A can offer as the first suggestion:

"The car sped up the cliff and plummeted into the ocean." And offer the explanation that the original sentence was awkward and bloated.

Suggester B can offer as the second suggestion:

"The car threw itself off the cliff."

The content author can then review the two suggestions and decide which suggestion to approve. For example, the content author may decide that the first suggestion is more appropriate and approve the first suggestion. Then, the selected content will be replaced by the first suggestion.

Furthermore, a suggester can make any number of suggestions for a selected content. For example, the system allows suggester A to make the first suggestion for the selected content. After making the suggestion, suggester A may think of another alternative suggestion. Thus, the system allows suggester A to once again select the content (i.e., selected content) and make the second suggestion.

A selected content can overlap or partially overlap with another selected content. For example, a portion of the first selected content may also be in the second selected content. The portion may be referred to as the overlapping portion. A first suggestion is associated with the first selected content. A second suggestion is associated with the second selected content. In a specific implementation, when the content author approves the first suggestion the first selected content is replaced with the first suggestion. In this specific implementation, the system blocks the content author from approving the second suggestion since the second suggestion may no longer be relevant. That is, the first selected content which includes the overlapping portion has been replaced with the first suggestion. And, since the second suggestion was made in reference to the overlapping portion, the second suggestion may no longer be relevant.

In another implementation, the system allows the content author to approve the second suggestion after the first suggestion has been approved. In this specific implementation, the approval of the first suggestion is undone. That is, the first suggestion is replaced by the first selected content. The second selected content is then replaced by the second suggestion.

The system facilitates or permits any number of annotations (e.g., suggestions or comments) to be associated or attached to user-generated content. These annotations can be by the same user or different users. So, a first user can select and annotate an entire paragraph. Then after the first user's annotation, a second user can select and annotate any portion of that paragraph (or the entire paragraph again) without restriction. The second user's annotation will not be a subannotation or reply to the first user's annotation. This feature of the system helps prevent system misuse (e.g., spam users) or others who might want to vandalize another person's user content.

Without this feature of the system, a first user may vandalize another person's user content (e.g., a fan site for the San Francisco Giants) by selecting the entire content and leaving a note "The Dodgers Rule!" Then without the implementation of described in this application, further annotations would be prevented altogether (but other users will see the graffiti). Or if the system allows subannotations or replies to the first annotation, then other user will see the graffiti first before other perhaps more serious comments. Therefore, the implementation as described in this application facilitates an open system which does not permit those who intend to misuse the system from abusing other user's content.

Further, the system facilitates the sharing of ideas such as for language learning and does not give any preference to the first user who leaves a comment. Subsequent users can leave annotations just as if they were the first user to leave an annotation. Later users who leave comments are not prevented from commenting on exactly the same user content or any portion of user content which was previously commented on.

In some implementations, users may be blocked from making suggestions. For example, users who abuse the system by making inappropriate suggestions (e.g., suggestions having foul language, racial epithets, or abusive language) may be blocked from making suggestions. The system may include a link to report users who make inappropriate suggestions.

In some implementations, users may be blocked from receiving suggestions. In a specific implementation, the system includes a payment scheme based on the suggestions. For example, in various implementations, a user is permitted to receive and access a threshold number of suggestions without having to make a payment to the system. Once the threshold number is reached, the user must make a payment in order receive and access suggestions. A user may be permitted to receive and access an unlimited number of suggestions for a threshold time period, such as during a trial time period. Once the trial time period has elapsed, the user must make a payment in order to receive and access suggestions.

A user may be permitted to receive a suggestion (or receive an indication that a suggestion has been made), but may not be permitted to access the suggestion (e.g., view the suggestion) unless the user makes a payment. The payment scheme may include a subscription-based payment mechanism, a pay-as-you-go payment mechanism, or both. In the subscription-based payment mechanism, a user pays, for example, a monthly fee to receive and access suggestions. The number of suggestions allowed to be received and accessed may be unlimited or may be capped at a specific threshold and thereafter an additional charge may apply. In the pay-as-you-go payment mechanism, the user pays to receive and access suggestions on a per suggestion basis.

In another implementation, an advertisement is included with the suggestion and a user must view the advertisement, listen to the advertisement, or both before being permitted to view the suggestion. In another implementation, a user can make a payment to not have to view the advertisement, listen to the advertisement, or both before being permitted to view the suggestion.

In a specific implementation, a method includes receiving a request from a first client device to view a first web page including at least a first paragraph of user-generated content stored in a user web pages database of a system. Transmitting the first web page with computer code to the first client device. The computer code is executable by a browser executing on first client device used to view the first web page. The method further includes permitting a first user at the first client device to select text in the first paragraph from within the browser, using the computer code at the first client device, detecting a selection of text in the first paragraph of the browser, using the computer code at the first client device, after the selection of text is made, permitting the first user to type a first annotation, and storing in an annotations database the first annotation and an associated position of the first annotation in the first paragraph. The annotations database is separate from the web pages database and resides on a storage device remote to the first client device.

The method further includes permitting a second user to select at least a portion of the text selected by the first user and permitting the second user to type a second annotation for the at least a portion of the text selected by the first user.

The permitting the second user to type a second annotation for the at least a portion of the text selected by the first user may include not displaying a warning message that another annotation had previously been entered for the at least a portion of the text selected by the first user.

The using the computer code at the first client device, after the selection of text is made, permitting the first user to type a first annotation further may further include permitting the first user to type a first replacement suggestion for the selection of text. The method may further include after permitting the first user to type a first replacement suggestion for the selection of text, if an owner of the first web page approves, replacing the selection of text with the first replacement suggestion.

In a specific implementation, a method includes receiving at a first client device a first Web page to be displayed within a first browser application and computer code to be executed by the first browser application, permitting a first user at the first client device to select text in a first paragraph of the first Web page within the first browser application, using the computer code, detecting a selection of the text in the first paragraph, using the computer code, requesting from the first user an annotation to be associated with the detected selection of text, and storing the annotation and position information identifying the first paragraph and a location of the detected selection of text in the first paragraph in a database residing at a server, remote from the first client device.

The method may further include receiving at a second client device the first Web page to be displayed within a second browser application, permitting a second user at the second client device to approve the annotation, after the second user approves the annotation, updating the first paragraph by replacing the detected selection of text with the annotation, storing the updated first paragraph in a second database, different from the database, at the server, and receiving at the second client device a second Web page to be displayed within the second browser application, where the second Web page includes the updated first paragraph.

The method may further include receiving at a third client device the second Web page to be displayed within a third browser application.

In an implementation, the requesting from the first user an annotation includes requesting from the first user an explanation of the annotation and the storing the annotation and position information includes storing the explanation in the database.

In an implementation, the method includes after the detecting a selection of the text in the first paragraph, using the computer code, drawing a window on top of the first Web page, where the window includes a first user-selectable option and a second user-selectable option.

The method may further include permitting a second user at a second client device to view the annotation and storing a time stamp in the database at the server indicating when the second user viewed the annotation.

In a specific implementation, a method includes receiving at a second client device the first Web page to be displayed within a second browser application, permitting a second user at the second client device to edit the annotation, after the second user edits the annotation, updating the first paragraph by replacing the detected selection of text with the edited annotation, storing the updated first paragraph in a second database, different from the database, at the server, and receiving at the second client device a second Web page to be displayed within the second browser application, where the second Web page includes the updated first paragraph.

The method may further include after the storing the annotation and position information, receiving at a second client device the first Web page to be displayed within a second browser application and the computer code, and using the computer code, permitting a second user at the second client device to turn on and turn off highlighting of the detected selection of text.

In a specific implementation, a method includes receiving at a first client device a first Web page to be displayed within a first browser application and computer code to be executed by the first browser application, permitting a first user at the first client device to select text in a first paragraph of the first Web page within the first browser application, where the first paragraph is associated with a paragraph identifier, using the computer code, detecting a selection of the text in the first paragraph, using the computer code, requesting from the first user an annotation to be associated with the detected selection of text, and storing the annotation, paragraph identifier, and position information identifying a location of the detected selection of text in the first paragraph in a database residing at a server, remote from the first client device.

In a specific implementation, a system includes a set of databases residing at a server. A first database includes a set of Web pages. Each Web page includes a set of paragraphs. Each paragraph has a unique paragraph identifier. There is also a client computer having a browser to request and receive a first Web page over a network. There is computer code transmitted from the server over the network to the client computer. The computer code is executable by the browser. The computer code includes the capability to detect a selection of text in a first paragraph of the first Web page by a first user at the client computer, receive an annotation to be associated with the detected selection of text from the first user, identify a unique paragraph identifier of the first paragraph, and transmit to the server the annotation, unique paragraph identifier of the first paragraph, and information indicating a position of the detected selection of text in the first paragraph, In this specific implementation, the annotation, unique paragraph identifier of the first paragraph, and information indicating a position of the detected selection of text in the first paragraph is stored in a second database.

In a specific implementation, a method includes providing a Web page including a set of content to be displayed on a computer display device using a Web browser, in response to a selection of a portion of a content by a user using a pointing device, providing a first view of a pop-up toolbox to the user. The first view of the pop-up toolbox includes a set of user-selectable options. In response to a selection of a first user-selectable option by the user using the pointing device, providing a second view of the pop-up toolbox to the user, where the second view of the toolbox includes a suggestion text entry box.

The method further includes receiving at a server input from the user including a suggestion inputted into the suggestion text entry box, and storing the suggestion and position information on the suggestion in a suggestions database at the server. The set of content is stored in a separate database and the position information includes information identifying the content and information identifying a location of the selected portion within the content.

In a specific implementation, a method includes transmitting from a server system code and content associated with a Web page to a client, invoking via the code a pop-up toolbox after a user selects a portion of the content using a pointing device at the client, where the pop-up toolbox allows the user to input a suggestion to be associated with the selected portion of content, receiving from the client the suggestion associated with the selected portion of content and first information. The first information includes a content identifier, a start position of the selected portion within the content, and an end position of the selected portion within the content. The method further includes storing the first information in a suggestions database. The suggestions database is separate from a database that stores the content associated with the Web page.

In a specific implementation, a method includes providing a first Web page including a set of paragraphs to be displayed on a computer client display device using a Web browser. Each paragraph includes a set of characters. The method further includes detecting on the display a click of a left mouse button of a pointing device by a first user indicating a start position of a subset of characters within a first paragraph, permitting the first user to hold down the left mouse button and drag a cursor of the pointing device over the subset of characters to select the subset, highlighting the subset of characters on the display as the first user drags the cursor, after detecting a release of the left mouse button by the first user indicating an end position of the subset, highlighting the subset of characters on the display in a translucent color and invoking a pop-up toolbox on the display in which the first user can enter a suggestion to be associated with the selected subset of characters, and storing at a server system the suggestion and first information in a suggestions database.

The first information includes a paragraph identifier identifying the first paragraph, the start position, and the end position, and the plurality of paragraphs are stored in a user Web pages database separate from the suggestions database.

In a specific implementation, a system includes a server, accessible to a plurality of client devices via a network. The server is operable to transmit to a first client device of a first user content created by a second user and a suggestions tool. The suggestions tool includes browser-executable code to detect the first user's selection of a portion of the content and to request from the first user a suggestion for the selected portion for the second user to accept or reject. There is a suggestions database. The suggestions database stores the suggestion and position information identifying a location of the selected portion of content. There is a user content database. The user content database stores the content created by the second user and when the second user accepts the suggestion, the content is updated with the suggestion via a replacement of the selected portion of content with the suggestion. The updated content is stored in the user content database.

The suggestions database may store a content identifier to associate the content created by the second user with the suggestion from the first user. The position information may include a starting position of the selected portion of content and an ending position of the selected portion of content. The browser-executable code of the suggestions tool may request from the first user an explanation of the suggestion. The explanation may be stored in the suggestions database. The content may include text.

In a specific implementation, a method includes receiving first suggestion information from a first client device of a first user of online content. The online content is created by a second user. The first suggestion information includes a first suggestion for a first selected portion of the online content for the second user to accept or reject, and first starting and ending positions of the first selection, the first selection being between the first starting and ending positions. The method further includes storing in a suggestion database the first suggestion, and the first starting and ending positions of the first selection. Receiving an indication that the second user has accepted the first suggestion. And after the receiving an indication that the second user has accepted the first suggestion, using the first starting and ending positions to replace the first selection between the first starting and ending positions with the first suggestion.

The method may further include receiving second suggestion information from a second client device of a third user of the online content, where the second suggestion information includes a second suggestion for a second selected portion of the online content for the second user to accept or reject, and second starting and ending positions of the second selection, the second selection being between the second starting and ending positions. Storing in the suggestion database the second suggestion and the second starting and ending positions of the second selection. Receiving an indication that the second user has accepted the second suggestion. And after the receiving an indication that the second user has accepted the second suggestion, using the second starting and ending positions to replace the second selection between the second starting and ending positions with the second suggestion. The second selection may include at least a portion of the first suggestion.

In an implementation, before the receiving an indication that the second user has accepted the first suggestion, the method includes receiving second suggestion information from a second client device of a third user of the online content. The second suggestion information includes a second suggestion for a second selected portion of the online content for the second user to accept or reject. At least a portion of the first and second selections overlap. The method includes storing in the suggestion database the second suggestion. And, after the receiving an indication that the second user has accepted the first suggestion, not permitting the second user to accept the second suggestion.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of annotating a document comprising:
   allowing a first user to access the document, wherein the document accessed by the first user comprises content provided by a second user and embedded executable code;
   using executable code of the document, detecting an indication by the first user of a first selection of text in the content;
   after the detecting the indication by the first user, using the executable code, seeking a first suggestion input from the first user;
   storing the first suggestion input from the first user, wherein the first suggestion is stored separately from the document;
   after the storing the first suggestion input from the first user, showing the second user the first suggestion input from the first user;
   presenting the second user a first option to accept the first suggestion input and a second option to reject the first suggestion input;
   when the second user accepts the first suggestion input, making a replacement of the first selection of text in the content, provided by the second user, of the document with the first suggestion input; and
   wherein the showing the second user the first suggestion input from the first user comprises:
      displaying the document and the content provided by the second user to the second user; and
      displaying a toolbox dialog box comprising a first box and a second box, wherein the first box comprises the first selection of text, the second box comprises the first suggestion input, and the toolbox dialog box is superimposed over at least a portion of the document.

2. The method of claim 1 comprising when the second user rejects the first suggestion input, not making a replacement of the first selection of text in the content, provided by the second user, of the document with the first suggestion input.

3. The method of claim 1 wherein before the when the second user accepts the first suggestion input, making a replacement of the first selection of text, the method comprises:
   allowing a third user to access the document;
   using executable code of the document, detecting an indication by the third user of a second selection of text in the content, wherein the second selection of text comprises at least a portion of the first selection of text;
   after the detecting the indication by the third user, using the executable code, seeking a second suggestion input from the third user;
   storing the second suggestion input from the third user;
   after the storing the second suggestion input from the third user, showing the second user the second suggestion input from the third user;
   presenting the second user a third option to accept the second suggestion input and a fourth option to reject the second suggestion input;
   when the second user accepts the second suggestion input, making a replacement of the second selection of text in the content, provided by the second user, of the document with the second suggestion input; and
   after the making a replacement of the second selection of text, not permitting the second user to accept the first suggestion input.

4. The method of claim 1 wherein after the when the second user accepts the first suggestion input, making a replacement of the first selection of text in the content, provided by the second user, of the document with the first suggestion input, the method comprises:
   allowing a third user to access the document, wherein the document accessed by the third user comprises content provided by the second user, the accepted first suggestion input, and embedded executable code;
   using executable code of the document, detecting an indication by the third user of a second selection of text in the content, wherein the second selection of text comprises at least a portion of the accepted first suggestion input;
   after the detecting the indication by the third user, using the executable code, seeking a second suggestion input from the third user;
   storing the second suggestion input from the third user;
   after the storing the second suggestion input from the third user, showing the second user the second suggestion input from the third user;
   presenting the second user a third option to accept the second suggestion input and a fourth option to reject the second suggestion input; and
   when the second user accepts the second suggestion input, making a replacement of the second selection of text in the content, comprising the at least a portion of the accepted first suggestion input, with the second suggestion input.

5. The method of claim 1 comprising:
seeking an explanation of the first suggestion input from the first user;
storing the explanation; and
during the presenting the second user a first option to accept the first suggestion input and a second option to reject the first suggestion input, presenting the second user the explanation.

6. The method of claim 1 wherein before the making a replacement of the first selection of text in the content, provided by the second user, the method comprises prompting the second user to confirm the acceptance of the first suggestion input.

7. The method of claim 1 wherein when the second user accepts the first suggestion input, sending a notification to the first user to inform the first user that the first suggestion input was accepted.

8. A system comprising:
a server, accessible to a plurality of client devices via a network, wherein the server stores a plurality of documents, accessible to each of the client devices via the network, each document comprising embedded executable code, and when the code is delivered to a client device, invokes a suggestion tool application to run at the client device,
wherein the suggestion tool, executing at the client device, detects any selections a first user at the client device makes to first content of a first document delivered to the client device and requests for each detected selection of a portion of the first content a suggestion from the first user, wherein the first content is provided by a second user;
a suggestions database residing on a storage device, coupled to the server, wherein the suggestions database comprises an entry for each suggestion made to the first content of the first document, each entry comprising a suggestion field and a position field, wherein the suggestion field comprises text of the suggestion and the position field comprises a position of where in the first content the suggestion was made;
a user content database residing on the storage device, coupled to the server, wherein the user content database is separate from the suggestions database and comprises an entry comprising a content field, wherein the content field comprises text of the first content, and when the second user accepts the suggestion, a portion of the text of the first content where the suggestion was made, indicated by the position, is replaced with the suggestion; and
wherein the position field for each entry in the suggestions database is a first position field, and each entry in the suggestions database comprises a second position field, wherein the first position field indicates a beginning position of a detected selection, and the second position field indicates an ending position of the detected selection.

9. The system of claim 8 wherein each entry in the suggestions database comprises a paragraph identifier field that references the first content in the user content database.

10. The system of claim 8 wherein the suggestion tool, executing at the client device, requests for each detected selection of a portion of the first content an explanation of the suggestion from the first user.

11. The system of claim 10 wherein the explanation is stored in the suggestions database.

12. The system of claim 10 wherein the explanation is optional.

13. A method of annotating a document comprising:
allowing a first user to access the document, wherein the document accessed by the first user comprises content provided by a second user and embedded executable code;
using executable code of the document, detecting an indication by the first user of a first selection of text in the content;
after the detecting the indication by the first user, using the executable code, seeking a first suggestion input from the first user;
storing the first suggestion input from the first user, wherein the first suggestion is stored separately from the document;
after the storing the first suggestion input from the first user, showing the second user the first suggestion input from the first user;
presenting the second user a first option to accept the first suggestion input and a second option to reject the first suggestion input;
when the second user accepts the first suggestion input, making a replacement of the first selection of text in the content, provided by the second user, of the document with the first suggestion input; and
wherein when the second user accepts the first suggestion input, sending a notification to the first user to inform the first user that the first suggestion input was accepted.

14. The method of claim 13 comprising when the second user rejects the first suggestion input, not making a replacement of the first selection of text in the content, provided by the second user, of the document with the first suggestion input.

15. The method of claim 13 wherein before the when the second user accepts the first suggestion input, making a replacement of the first selection of text, the method comprises:
allowing a third user to access the document;
using executable code of the document, detecting an indication by the third user of a second selection of text in the content, wherein the second selection of text comprises at least a portion of the first selection of text;
after the detecting the indication by the third user, using the executable code, seeking a second suggestion input from the third user;
storing the second suggestion input from the third user;
after the storing the second suggestion input from the third user, showing the second user the second suggestion input from the third user;
presenting the second user a third option to accept the second suggestion input and a fourth option to reject the second suggestion input;
when the second user accepts the second suggestion input, making a replacement of the second selection of text in the content, provided by the second user, of the document with the second suggestion input; and
after the making a replacement of the second selection of text, not permitting the second user to accept the first suggestion input.

16. The method of claim 13 wherein after the when the second user accepts the first suggestion input, making a replacement of the first selection of text in the content, provided by the second user, of the document with the first suggestion input, the method comprises:
allowing a third user to access the document, wherein the document accessed by the third user comprises content provided by the second user, the accepted first suggestion input, and embedded executable code;

using executable code of the document, detecting an indication by the third user of a second selection of text in the content, wherein the second selection of text comprises at least a portion of the accepted first suggestion input;

after the detecting the indication by the third user, using the executable code, seeking a second suggestion input from the third user;

storing the second suggestion input from the third user;

after the storing the second suggestion input from the third user, showing the second user the second suggestion input from the third user;

presenting the second user a third option to accept the second suggestion input and a fourth option to reject the second suggestion input; and when the second user accepts the second suggestion input, making a replacement of the second selection of text in the content, comprising the at least a portion of the accepted first suggestion input, with the second suggestion input.

17. The method of claim 13 comprising:

seeking an explanation of the first suggestion input from the first user;

storing the explanation; and during the presenting the second user a first option to accept the first suggestion input and a second option to reject the first suggestion input, presenting the second user the explanation.

18. The method of claim 13 wherein before the making a replacement of the first selection of text in the content, provided by the second user, the method comprises prompting the second user to confirm the acceptance of the first suggestion input.

* * * * *